US012116047B1

(12) United States Patent
Yeomans et al.

(10) Patent No.: US 12,116,047 B1
(45) Date of Patent: Oct. 15, 2024

(54) COVER PANEL

(71) Applicants: Paul D. Yeomans, Morgan Hill, CA (US); Paul D. Kaufhold, San Francisco, CA (US); Moshe J. Baum, San Juan Bautista, CA (US)

(72) Inventors: Paul D. Yeomans, Morgan Hill, CA (US); Paul D. Kaufhold, San Francisco, CA (US); Moshe J. Baum, San Juan Bautista, CA (US)

(73) Assignee: APPLE INC., Cupertino, CA (US)

( * ) Notice: Subject to any disclaimer, the term of this patent is extended or adjusted under 35 U.S.C. 154(b) by 402 days.

(21) Appl. No.: 17/575,180

(22) Filed: Jan. 13, 2022

Related U.S. Application Data

(60) Provisional application No. 63/156,036, filed on Mar. 3, 2021.

(51) Int. Cl.
*B62D 35/02* (2006.01)
*B62D 35/00* (2006.01)
*B62D 37/02* (2006.01)

(52) U.S. Cl.
CPC ........... *B62D 35/02* (2013.01); *B62D 35/005* (2013.01); *B62D 37/02* (2013.01)

(58) Field of Classification Search
CPC .... B62D 35/001; B62D 35/005; B62D 35/02; B62D 37/02
USPC ................................. 296/180.1, 180.2, 180.5
See application file for complete search history.

(56) References Cited

U.S. PATENT DOCUMENTS

| | | | |
|---|---|---|---|
| 4,770,457 | A | 9/1988 | Tomforde |
| 7,988,220 | B2 | 8/2011 | Oda |
| 8,162,380 | B2 | 4/2012 | Sumitani et al. |
| 8,260,519 | B2 | 9/2012 | Canfield |
| 8,297,685 | B2 | 10/2012 | Wolf et al. |
| 8,579,361 | B2 | 11/2013 | Takeuchi |
| 8,731,781 | B2 | 5/2014 | Prentice |
| 8,979,102 | B1 | 3/2015 | Prentice |
| 9,327,778 | B2 | 5/2016 | Wolf |
| 9,567,016 | B2 | 2/2017 | Magee |
| 9,643,664 | B2 | 5/2017 | Tesch et al. |
| 9,902,438 | B2 | 2/2018 | Bray et al. |
| 10,081,400 | B2 | 9/2018 | Abdoul Azizou et al. |
| 10,093,361 | B2 | 10/2018 | Wilson |
| 10,189,513 | B2 | 1/2019 | Heil |

(Continued)

FOREIGN PATENT DOCUMENTS

| | | | |
|---|---|---|---|
| CN | 117104358 A | * | 11/2023 |
| DE | 3110991 A1 | | 5/1982 |

(Continued)

*Primary Examiner* — Jason S Daniels
(74) *Attorney, Agent, or Firm* — Young Basile Hanlon & MacFarlane, P.C.

(57) ABSTRACT

A body defines a wheel arch, a wheel assembly is located in the wheel arch, and a panel is located adjacent to the wheel arch and inboard relative to the wheel assembly. An actuator is configured to move the panel between an extended position and a retracted position, wherein the panel is adjacent to the wheel assembly in the extended position and the panel is spaced from the wheel assembly in the retracted position. The actuator is configured to move the panel between the extended position and the retracted position in response to a control signal that is generated based on a sensed condition.

12 Claims, 23 Drawing Sheets

(56) References Cited

U.S. PATENT DOCUMENTS

| | | | |
|---|---|---|---|
| 10,272,957 B2 | 4/2019 | Klop et al. | |
| 10,315,711 B2 | 6/2019 | Demetrio et al. | |
| 10,370,042 B2 | 8/2019 | Bray et al. | |
| 10,421,505 B2 | 9/2019 | Tjoelker et al. | |
| 10,457,340 B2 | 10/2019 | Potvin et al. | |
| 10,479,423 B2 | 11/2019 | Seidler et al. | |
| 10,654,532 B2 * | 5/2020 | Nakamura | B62D 35/02 |
| 10,752,303 B2 | 8/2020 | Parry-Williams et al. | |
| 11,840,288 B2 * | 12/2023 | Watanabe | B60C 19/00 |
| 2011/0309652 A1 | 12/2011 | Eichentopf et al. | |
| 2015/0048648 A1 * | 2/2015 | Wolf | B62D 35/02 |
| | | | 296/180.5 |
| 2015/0232138 A1 | 8/2015 | Parry-Williams et al. | |
| 2016/0185402 A1 | 6/2016 | Tesch et al. | |
| 2016/0280284 A1 | 9/2016 | Scholz et al. | |
| 2017/0057565 A1 | 3/2017 | Sarhadiangardabad | |
| 2017/0299006 A1 | 10/2017 | Shi et al. | |
| 2019/0061839 A1 | 2/2019 | Schmitt et al. | |
| 2019/0202504 A1 | 7/2019 | Mandl et al. | |
| 2020/0010128 A1 | 1/2020 | Herlem | |
| 2020/0094888 A1 | 3/2020 | Grebel | |
| 2020/0102026 A1 | 4/2020 | Nishida et al. | |
| 2020/0172058 A1 | 6/2020 | Demetrio et al. | |

FOREIGN PATENT DOCUMENTS

| | | |
|---|---|---|
| DE | 3239946 A1 | 5/1984 |
| DE | 10209591 A1 | 9/2003 |
| DE | 102010004532 A1 | 8/2010 |
| DE | 102010018779 B4 | 9/2020 |
| EP | 0888956 B1 | 8/2002 |
| EP | 2088060 A1 | 8/2009 |
| FR | 2961468 B1 | 9/2015 |
| JP | H06144296 A | 5/1994 |
| JP | 4487935 B2 | 6/2010 |

* cited by examiner

COVER PANEL

CROSS-REFERENCE TO RELATED APPLICATION(S)

This application claims the benefit of U.S. Provisional Patent Application No. 63/156,036, filed on Mar. 3, 2021, the content of which is hereby incorporated by reference in its entirety for all purposes.

TECHNICAL FIELD

This disclosure relates to aerodynamics.

BACKGROUND

Automobile bodies often include a wheel arch, which is an area where the wheel, tire, and associated components are located. The wheel arch of a vehicle is typically sized to accommodate a full range of elevational, longitudinal, and pivoting motions of the wheel and tire, so that the wheel and tire do not contact the vehicle body or other structures during suspension travel and turning.

SUMMARY

One aspect of the disclosure is a vehicle that includes a vehicle body that defines a wheel arch, a wheel assembly that is located in the wheel arch, and a panel that is located adjacent to the wheel arch and inboard relative to the wheel assembly. The vehicle also includes an actuator that is configured to move the panel between an extended position and a retracted position, wherein the panel is adjacent to the wheel assembly in the extended position and the panel is spaced from the wheel assembly in the retracted position. The actuator is configured to move the panel between the extended position and the retracted position in response to a control signal that is generated based on a sensed condition.

The sensed condition may be a vehicle speed of the vehicle. The sensed condition may be a steering movement of the wheel assembly. The sensed condition may be a current location of the vehicle, wherein the actuator moves the panel to the extended position if the current location of the vehicle corresponds to a limited access highway and the actuator moves the panel to the retracted position if the current location of the vehicle corresponds to a non-limited access road. The sensed condition may be an imminent upcoming steering movement. The imminent upcoming steering movement may be predicted based on navigation data. The imminent upcoming steering movement may be predicted based on autonomous vehicle control information.

Another aspect of the disclosure is a vehicle that includes a wheel arch, a wheel assembly that is located in the wheel arch, and a panel that is located inboard from the wheel assembly, wherein the panel includes a base portion and a first panel portion that is connected to the base portion. An actuator is configured to move the panel between an extended position and a retracted position, wherein the first panel portion is adjacent to the wheel assembly in the extended position and the first panel portion is moved inboard relative to the base portion to define the retracted position.

The first panel portion may be slidingly connected to the base portion in a stacked configuration. The first panel portion may be connected to the base portion in a telescoping configuration. The vehicle may also include a second panel portion, wherein the first panel portion and the second panel portion are slidingly connected to the base portion in a stacked configuration. The vehicle may also include a second panel portion, wherein the first panel portion and the second panel portion are slidingly connected to the base portion in a telescoping configuration.

Another aspect of the disclosure is a vehicle that includes a wheel arch, a wheel assembly that is located in the wheel arch, and an inflatable panel that is located inboard relative to the wheel assembly and is movable between an extended position and a retracted position relative to the wheel assembly by inflation and deflation of the inflatable panel.

The vehicle may also include an inflator that is configured to supply gas to the inflatable panel to inflate the inflatable panel to move from the retracted position to the extended position. Gas may be expelled from the inflatable panel to deflate the inflatable panel to during from the extended position to the retracted position. The vehicle may also include tension members that are configured to urge an outboard side of the inflatable panel away from the wheel assembly during movement from the extended position to the retracted position. The inflatable panel may extend from a wheel arch wall toward the wheel assembly and substantially obstructs a wheel arch opening of the wheel arch in the extended position. The inflatable panel may be moved away from the wheel assembly in the retracted position relative to the extended position in order to provide space for the wheel assembly to turn during steering movements.

Another aspect of the disclosure is a vehicle that includes a wheel arch that is defined by a vehicle body, a wheel assembly that is located in the wheel arch, and a panel assembly that includes a base portion that is connected to the vehicle body, a wheel anchor portion that is connected to the wheel assembly so that the anchor portion turns with the wheel assembly during steering movements of the wheel assembly, and a flexible panel that is connected to the base portion and the wheel anchor portion. The flexible panel includes a rolling lobe configuration that allows the flexible panel to deform in order to allow the steering movements of the wheel assembly.

The flexible panel may be configured to obstruct entry of air into the wheel arch through a wheel arch opening of the wheel arch. The rolling lobe configuration of the flexible panel may include a first lobe, a second lobe, and an intermediate portion of the flexible panel that is located between the first lobe and the second lobe. A length of the intermediate portion of the rolling lobe configuration may increase and decrease during the steering movements of the wheel assembly. An outboard portion of the flexible panel may extend from the wheel anchor portion to the first lobe of the rolling lobe configuration and an inboard portion of the flexible panel may extend from the base portion to the second lobe of the rolling lobe configuration.

Another aspect of the disclosure is a vehicle that includes a wheel arch that is defined by a vehicle body, a wheel assembly that is located in the wheel arch, and a housing that is located forward from the wheel arch. A flap is located in the housing in a retracted position and is movable to an extended position in which the flap extends downward out of the housing to disrupt airflow in front of the wheel arch. A closure panel is movable between a closed position, in which the closure panel blocks access to an interior of the housing and is generally aligned with an adjacent surface of the vehicle body, and an open position, in which the closure panel is angled downward relative to the adjacent surface of the vehicle body. The vehicle may also include an actuator assembly that is configured to move the flap between the retracted position and the extended position, wherein the closure panel is moved from the closed position to open position by engagement of the flap with the closure panel during movement of the flap from the retracted position to the extended position.

DETAILED DESCRIPTION

Cover panels are disclosed herein that reduce entry of air into a wheel arch to improve aerodynamic performance and reduce drag. The cover panels are underbody panels that are located adjacent to a lower surface of the vehicle and are exposed to an air stream that flows between the vehicle and an underlying surface (e.g., a ground surface or a road surface). The cover panels are configured to move relative to the wheel and tire assemblies of the vehicle to place the cover panels close to the wheel and tire assemblies during straight-line travel and to move the panels away from the wheel and tire assemblies during turning. Straight-line travel corresponds to a limited range of steering angles such as those experienced during lane keeping and lane changes and typically corresponds to high-speed travel. Turning corresponds to a larger range of steering angles such as those experienced when turning at an intersection and typically corresponds to low speed travel. Passive and active mechanisms can be used for moving the cover panels. Moving the cover panels can include, as examples, pivoting, translating, and/or deformation.

Figure 1:
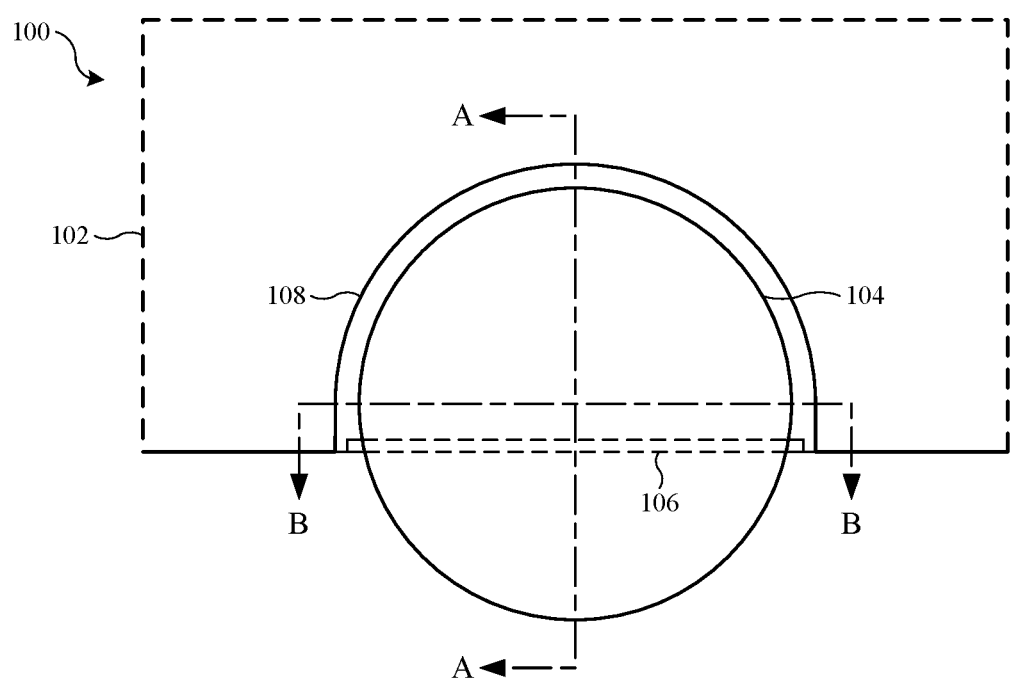
FIG. 1 is an illustration of a vehicle.

FIG. 1 is an illustration of a vehicle 100. The vehicle 100 may be a conventional road-going vehicle that is supported by wheels and tires (e.g., four wheels and tires). The vehicle 100 may be a passenger vehicle that includes a passenger compartment that is configured to carry one or more passengers. The vehicle 100 may be a cargo vehicle that is configured to carry cargo items in a cargo compartment. In the illustrated implementation, the vehicle 100 includes a vehicle body 102, a wheel assembly 104 (e.g., including a wheel and tire), and a panel 106 (e.g., a cover panel) that restricts entry of air flow into a wheel arch 108 (which may also be referred to as a wheelhouse) that is defined by the vehicle body 102.

Figure 2:
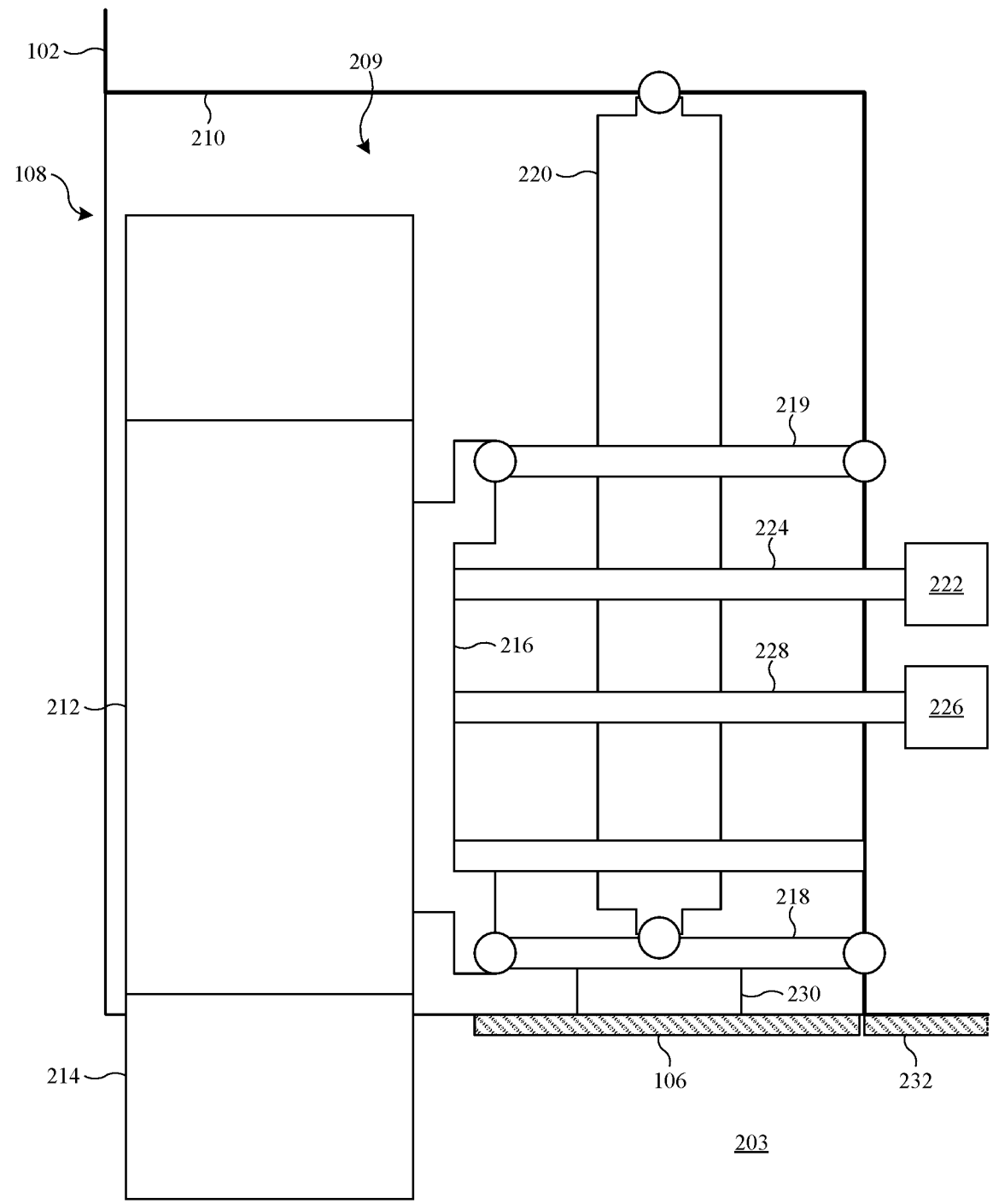
FIG. 2 is an illustration of the vehicle taken along line A-A of FIG. 1.

FIG. 2 is an illustration of the vehicle 100, taken along line A-A of FIG. 1 looking forward in a longitudinal direction of the vehicle 100, and shows connection of the wheel assembly 104 to the vehicle body 102 inside the wheel arch 108. The interior of the wheel arch 108 is defined by a wheel arch wall 210, which may be defined by a portion of the vehicle body 102 and/or components connected to the vehicle body 102. An internal space 209 is defined inside the wheel arch 108, bounded by the wheel arch wall 210, the panel 106, and the wheel assembly 104.

The wheel assembly 104 is a road-contacting wheel assembly that include a wheel rim 212 and a tire 214 that is mounted on the wheel rim 212. The wheel rim 212 is supported by connection to a hub assembly 216 (e.g., including a wheel hub and a steering knuckle) so that the wheel assembly 104 is able to rotate (e.g., by a wheel bearing). The hub assembly 216 is connected to the vehicle body 102 by transverse links (e.g., connecting structures that extend in a generally side-to-side direction of the vehicle 100), such as a lower control arm 218 and an upper control arm 219 in the illustrated implementation, so that the wheel assembly 104 is able to translate in a generally vertical direction. The lower control arm 218 and the upper control arm 219 each have an outer end that is pivotally connected to the hub assembly 216 and an inner end that is pivotally connected to the vehicle body 102, with the lower control arm 218 being connected near a bottom of the hub assembly 216 and the upper control arm 219 being connected near a top of the hub assembly 216.

A suspension component 220 controls the motion (e.g., translation in the generally vertical direction) of the wheel assembly 104 with respect to the vehicle body 102. The suspension component 220 may be a passive suspension component (e.g., a shock, a strut, and/or an air spring) or may be an active suspension component that is operable to actively apply forces to the wheel assembly 104. Multiple suspension components may be included to control motion of the wheel assembly 104, such as a combination of active and passive suspension components. The suspension component 220 is connected in a manner that allows it to apply forces between the wheel assembly 104 and the vehicle body 102, whether connected directly or indirectly to the wheel assembly 104 and/or the vehicle body 102. In the illustrated example, an upper end of the suspension component 220 is connected to the vehicle body 102 and a lower end of the suspension component 220 is connected to the lower control arm 218. Other configurations may be used to connect the suspension component 220 to apply forces between the wheel assembly 104 and the vehicle body 102, such as connection of the upper end of the suspension component 220 to the vehicle body 102 and connection of the lower end of the suspension component 220 the hub assembly 216.

A steering mechanism 222 is connected to hub assembly 216 by a tie rod 224 in order to change the steering angle of the wheel assembly 104. As an example, the steering mechanism 222 may be a rack and pinion type steering mechanism that is controlled by mechanical connection to a steering wheel or by an actuator for steer-by-wire or autonomous control. A propulsion component 226 is connected to the hub assembly 216 by a propulsion shaft 228. As an example, the propulsion component 226 may include a motor (e.g., an electric motor or an internal combustion motor), gearbox, or other component that creates or transmits driving torque.

The panel 106 is supported by a connecting structure 230. The connecting structure 230 is connected to part of the vehicle 100, such as the vehicle body 102, the hub assembly 216, or the control arm 218. In the illustrated implementation, the connecting structure 230 is connected to the lower control arm 218 and supports the panel 106 with respect to the lower control arm 218. Other configurations are possible for the connecting structure. For example, the connecting structure 230 can connect the panel 106 to the vehicle body 102. For example, the connecting structure 230 can connect the panel 106 to the hub assembly 216. For example, the connecting structure 230 can include multiple portions that each define a connection between the panel 106 and another part of the vehicle 100.

The panel 106 is movable between an extended position and a retracted position (e.g., a first position and a second position). The extended position is used when the wheel assembly 104 is in a neutral position (e.g., steering angle of approximately zero for straight-line travel), in order to improved aerodynamic performance. The retracted position is used when the wheel assembly 104 is pivoted to steer in a first direction (e.g., to the left) or in a second direction (e.g., to the right) in order to provide room for the wheel assembly 104 to turn within the wheel arch 108.

In the extended position, the panel 106 is positioned adjacent to and inboard from the wheel assembly 104 so that is adjacent to an internal space of the wheel arch 108, and substantially obstructs access to the internal space 209 from an external space 203 that is located under the vehicle 100 between the vehicle body 102 and an underlying surface such as a road surface or ground surface. The panel 106 also obstructs entry of air into the internal space 209 of the wheel arch 108 at a wheel arch opening that is adjacent to an underbody of the vehicle 100 and is located where the wheel arch 108 meets the external space 203. Thus, when the panel 106 is in the extended position, it is able to significantly reduce entry of air from the external space 203 into the internal space 209, which reduces drag, pressures, and turbulence that may result from to entry of air into the internal space 209 of the wheel arch 108.

In the retracted position of the panel 106, either all of the panel 106 or a portion of the panel 106 has moved away from the wheel assembly 104 in order to provide space for the wheel assembly 104 to turn on a generally upright axis for steering movements. The interface of the external space 203 and the internal space 209 may remain partially obstructed by the panel 106 but is obstructed to a lesser degree as compared to the extended position. For example, at least part of the panel 106 may be moved inboard (e.g., toward the lateral center of the vehicle 100) in the retracted position relative to the extended position.

In the extended position, a bottom surface of the panel 106 may be adjacent to, at a substantially same elevation as, and generally aligned with an underbody surface of the vehicle 100, which is defined by an underbody panel 232 that is connected to the vehicle body 102 adjacent to the wheel arch 108 in the illustrated implementation but may also be defined by a bottom surface of the vehicle body 102. Alternatively, the panel 106 may be positioned slightly lower than the vehicle body 102 and/or the underbody panel 232 so that it may translate or pivot from the extended position to the retracted position without interference from the vehicle body 102 and/or the underbody panel 232.

Although the panel 106 is shown as a single-part structure, it should be understood that the panel 106 (and other panels described herein) can instead be multi-part structures (e.g., multiple panel portions or multiple panels) that cooperate to perform the functions described with respect to the panel 106.

The connecting structure 230 may include components that are configured to move the panel 106 between the extended position and the retracted position. For example, the connecting structure 230 may be configured to move the panel 106 by pivoting, translating, and/or deformation. Specific implementations will be discussed further herein.

Movement of the panel 106 between the extended position and the retracted position can be passive movement or active movement. Examples of passive movement of the panel 106 between the extend position and the retracted position include movement in response to air pressure changes (e.g., by air pressure acting on the panel 106), movement in response to pivoting of the wheel assembly 104 during steering (e.g., using a linkage), and inflation or deflation of an inflatable portion of the panel 106 in response to air pressure changes during acceleration and deceleration of the vehicle 100 (e.g., using an air scoop or similar structure). Examples of active movement of the panel 106 include movement using a controllable electric actuator, movement using a controllable pneumatic actuator, and movement using a controllable hydraulic actuator. In active movement implementations, operation of an actuator used for active movement can be controlled by outputting commands (e.g., signals or data) in response to conditions such as speed, steering movements, upcoming future steering movements (e.g., determined using information from a navigation system or autonomous control system, or information describing the roadway that the vehicle is traveling on (e.g., high speed or low speed, limited access highway or local street, etc.) obtained, for example, from a navigation system of the vehicle 100.

As an example, the panel 106 can be moved from the extended position to the retracted position when the vehicle speed is below a threshold value and can be moved from the retracted position to the extended position when the vehicle speed is above the threshold value. As an example, the panel 106 can be moved from the extended position to the retracted position when the location of the vehicle 100 corresponds to a non-limited access road (e.g., a local street) and can be moved from the retracted position to the extended position when the location of the vehicle 100 corresponds to a limited access highway. As another example, the panel 106 can be moved from the extended position to the retracted position upon determining that the wheel assembly 104 is being steered away from a neutral position and can be moved from the retracted position to the extended position upon determining that the wheel assembly 104 has been returned to the neutral position. As another example, the panel 106 can be moved from the extended position to the retracted position in response to an imminent (e.g., within a time or distance threshold) steering movement predicted based on navigation data or autonomous vehicle control information and can be moved from the retracted position to the extended position in response to determining that there is no imminent steering movement predicted. Thus, as will be described further herein, an actuator may be configured to move the panel 106 between the extended position and the retracted position in response to a control signal that is generated based on a sensed condition, wherein the sensed condition is an imminent upcoming steering movement. As one example, the imminent upcoming steering movement may be predicted based on navigation data. As another example, the imminent upcoming steering movement may be predicted based on autonomous vehicle control information.

In some implementations, the vehicle 100 uses a ride height control function to control the elevation of the panel 106 with respect to other structures of the vehicle 100, such as a lower surface of the vehicle body 102 and/or the underbody panel 232. Ride height control may be implemented using the suspension component 220 and/or other suspension components. Using the ride height control function, the suspension components are controlled to align the panel 106 elevationally with the lower surface of the vehicle body 102 and/or the underbody panel 232 when the panel 106 is in the extended position. Prior to moving the panel 106 to the retracted position, the ride height control function is controlled to lower the elevational position of the panel 106 relative to the lower surface of the vehicle body 102 and/or the underbody panel 232 so that the panel 106 is able to move from the extended position to the retracted position without being obstructed by the vehicle body 102, the underbody panel 232 and/or other structures of the vehicle 100.

Figure 3:
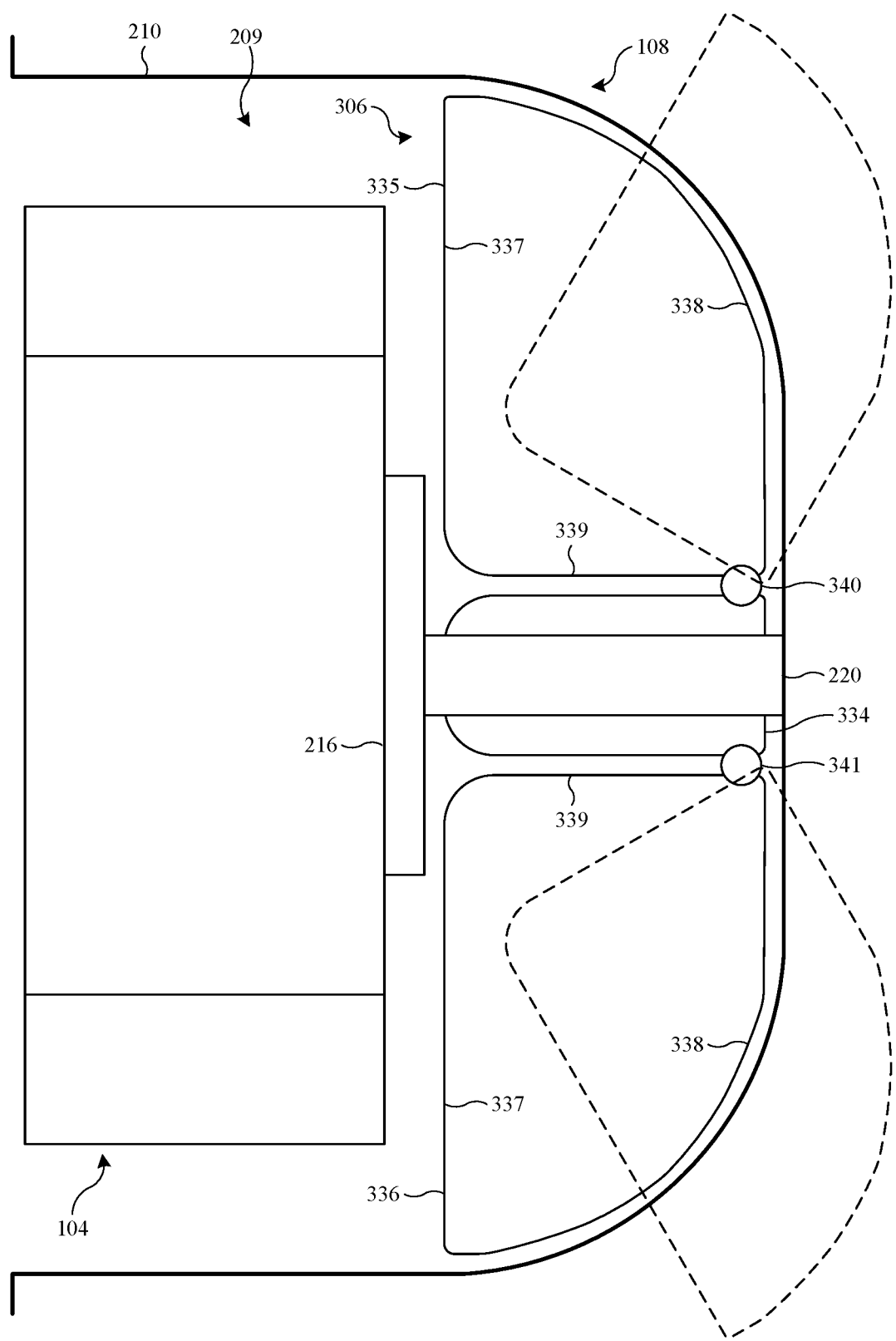
FIG. 3 is an illustration of the vehicle taken along line B-B of FIG. 1 that shows a first implementation of a panel.

FIG. 3 is an illustration, taken along line B-B of FIG. 1, of a panel assembly 306, which is a first example implementation of the panel 106. The description of the vehicle 100 and all of its components, including the description of the panel 106, applies to the panel assembly 306 unless stated otherwise herein. Some components are omitted from FIG. 3 for clarity, such as the upper control arm 219, the suspension component 220, the tie rod 224, and the propulsion shaft 228.

The panel assembly 306 includes a central portion 334 (e.g., a fixed portion or a fixed central portion), a first retractable panel 335 (e.g., a fore portion), and a second retractable panel 336 (e.g., an aft portion). The central portion 334 is connected to and supported by a lateral link from the vehicle body 102 to the hub assembly 216, such as the lower control arm 218 in the illustrated implementation. The first retractable panel 335 is located forward relative to the central portion 334, and the second retractable panel 336 is located rearward relative to the central portion 334. The first retractable panel 335 and the second retractable panel 336 each have an outboard side 337 (e.g., an outboard periphery portion) that is adjacent to the wheel assembly 104, an inboard side 338 (e.g., an inboard periphery portion) that is adjacent to the wheel arch wall 210, and a lateral side 339 (e.g., a lateral periphery portion) that is adjacent to the central portion 334 in the extended position of the panel assembly 306.

A first actuator 340 and a second actuator 341 are connected to the first retractable panel 335 and the second retractable panel 336, respectively, to move the first retractable panel 335 and the second retractable panel 336 between the extended position (shown in solid lines) and the retracted position (shown in broken lines). The first actuator 340 and the second actuator 341 may be electromechanical actuators that include an electric motor. The first actuator 340 and the second actuator 341 are operated by control signals that may be generated in response to sensed conditions, as discussed with respect to the panel 106. The first actuator 340 and the second actuator 341 may be operated in unison or independently.

In the illustrated example, the first actuator 340 is mounted on the central portion 334 and is connected to the first retractable panel 335, and the second actuator 341 is mounted on the central portion 334 and is connected to the second retractable panel 336. Alternatively, the first actuator 340 and the second actuator 341 may be mounted on the lower control arm 218 or the wheel arch wall 210 and connected to the first retractable panel 335 and the second retractable panel 336, respectively. The extended position of the first retractable panel 335 and the second retractable panel 336 is generally as described previously with respect to the panel 106. To move the panel assembly 306 to the retracted position, the first actuator 340 and/or the second actuator 341 are used to pivot one or both of the first retractable panel 335 and the second retractable panel 336 around respective pivot axes that are located at the first actuator 340 and the second actuator 341 and which may be generally upright.

To allow clearance of the first retractable panel 335 and the second retractable panel 336 relative to the vehicle body 102 and/or the underbody panel 232 (FIG. 2), the first retractable panel 335 and the second retractable panel 336 may be located below the other components, the first retractable panel 335 and the second retractable panel 336 may be lowered prior to pivoting (e.g., using ride height control or a two-stage motion control mechanism incorporated each of the first actuator 340 and second actuator 341), or the respective pivot axes of the first retractable panel 335 and the second retractable panel 336 may be inclined so that the first retractable panel 335 and the second retractable panel 336 move downward during pivoting from the extended position to the retracted position and move upward during pivoting from the retracted position to the extended position.

Figure 4:
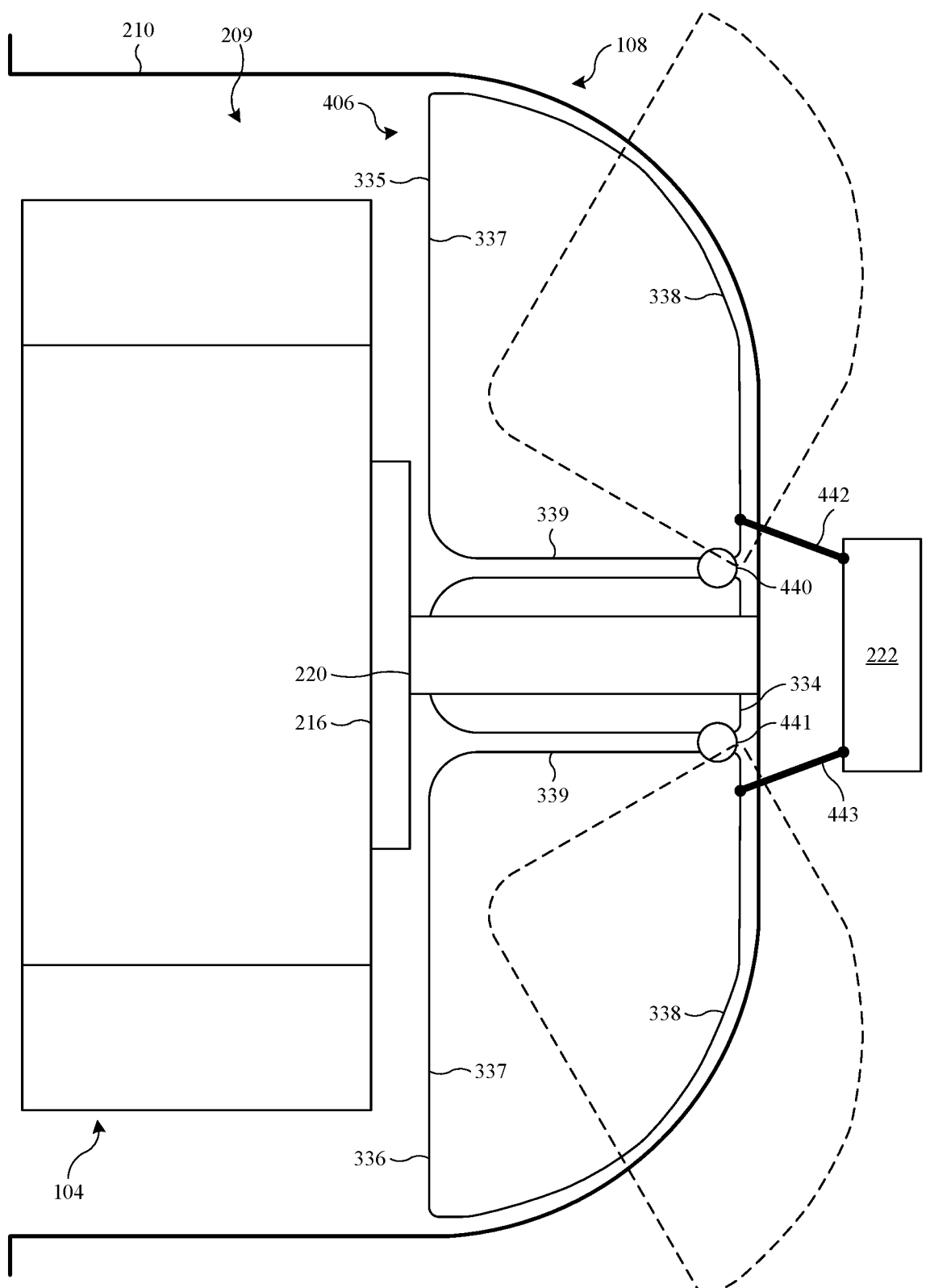
FIG. 4 is an illustration of the vehicle taken along line B-B of FIG. 1 that shows a second implementation of a panel.

FIG. 4 is an illustration, taken along line B-B of FIG. 1, of a panel assembly 406, which is a second example implementation of the panel 106. The description of the panel assembly 306 applies to the panel assembly 406 unless stated otherwise herein. In the panel assembly 406, the first actuator 340 and the second actuator 341 are replaced by a first pivot joint 440 and a second pivot joint 441, which are not actuated but are located and connected in the manner described with respect to the first actuator 340 and the second actuator 341. The first retractable panel 335 and the second retractable panel 336 are instead connected to the steering mechanism 222 by a first linkage 442 and a second linkage 443 to drive rotation of the first retractable panel 335 and the second retractable panel 336 between the extended position and the retracted position, either in unison or independently, in response to motion of the steering mechanism 222 during steering of the wheel assembly 104. Connection to the steering mechanism 222 may be direct or may be indirect, for example, by connection to a steered component such as the hub assembly 216.

Figure 5:
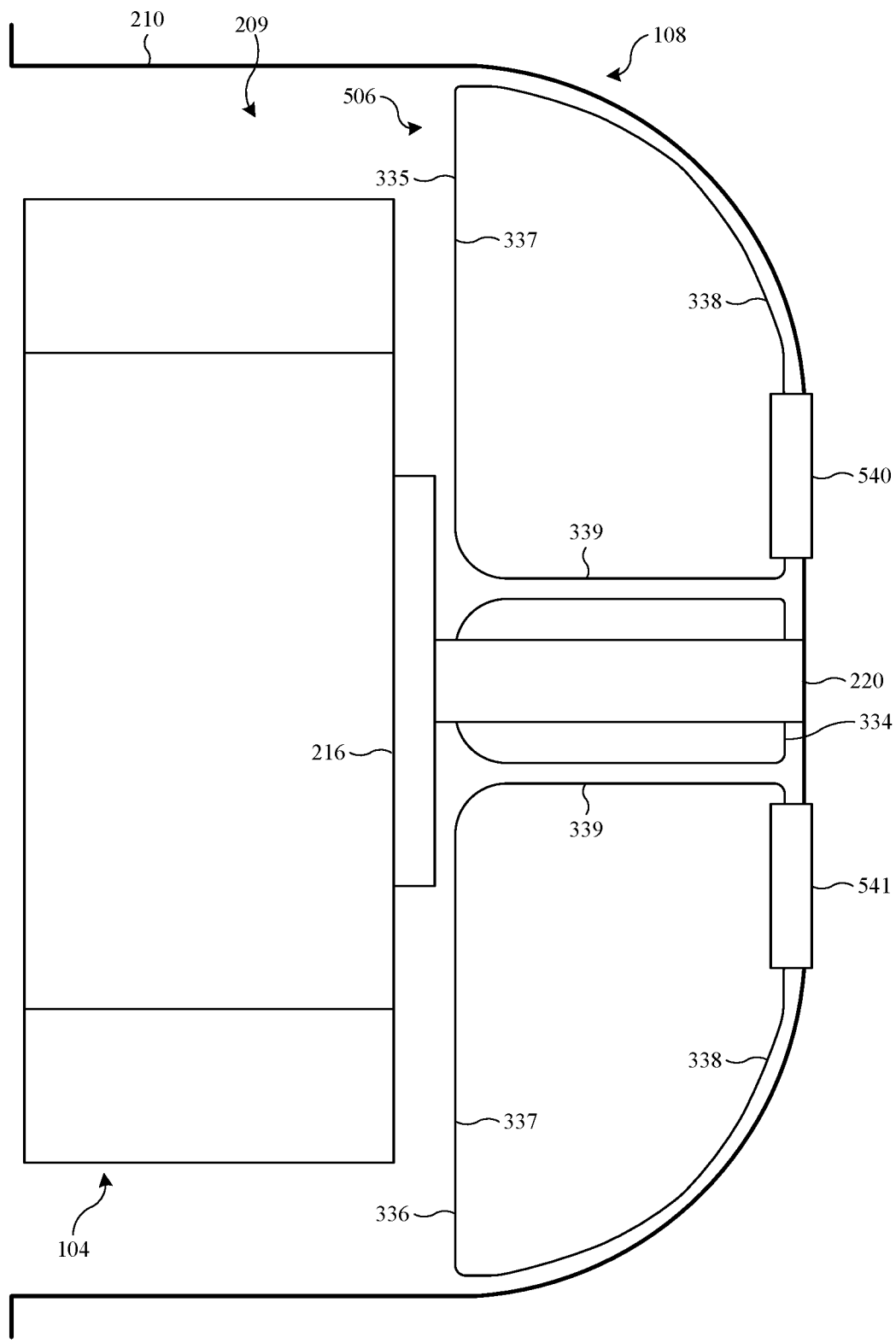
FIG. 5 is an illustration of the vehicle taken along line B-B of FIG. 1 that shows a third implementation of a panel.
Figure 6:
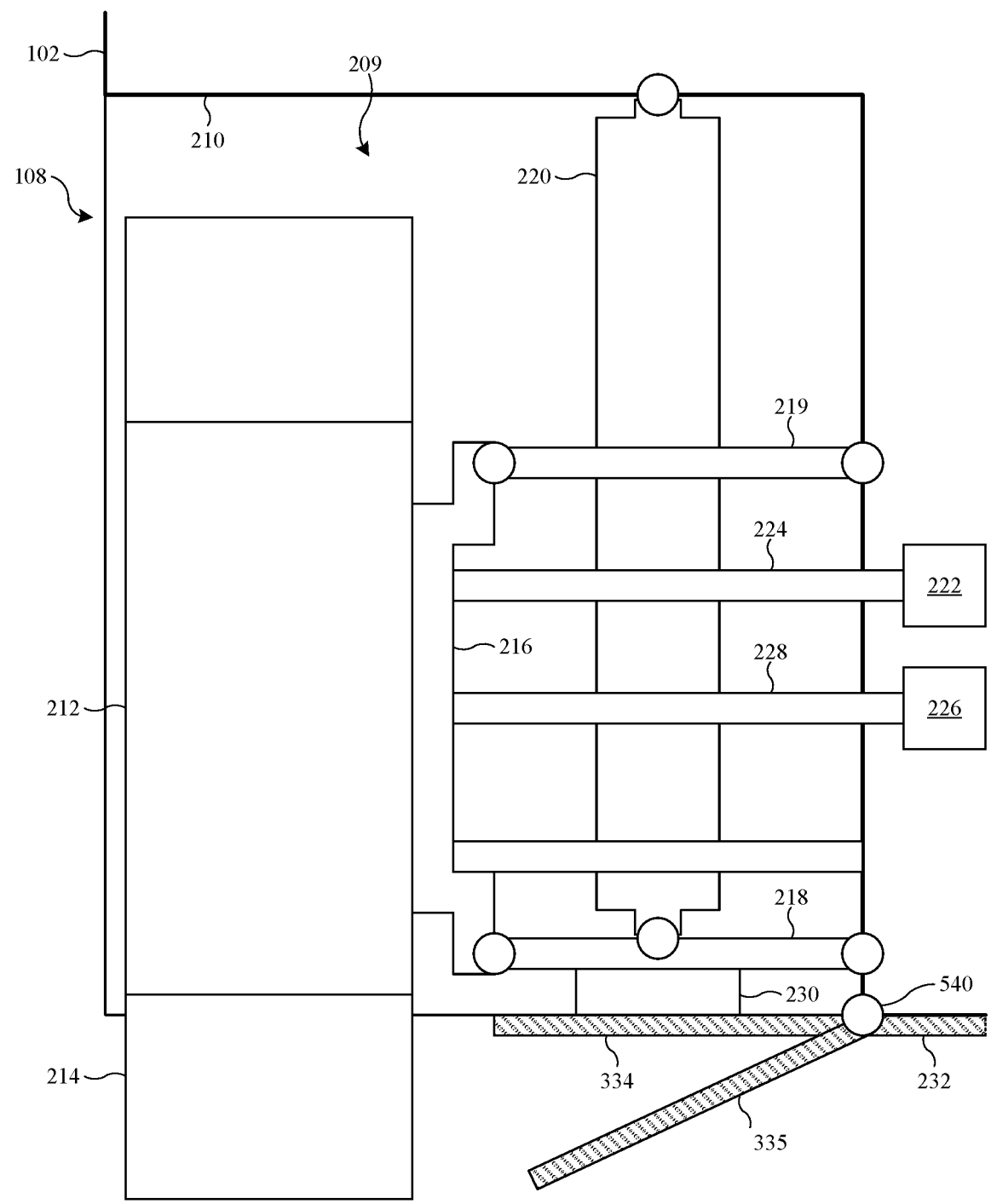
FIG. 6 is an illustration of the vehicle taken along line A-A of FIG. 1 that shows the third implementation of the panel.

FIG. 5 is an illustration, taken along line B-B of FIG. 1, of a panel assembly 506, which is a third example implementation of the panel 106. FIG. 6 is an illustration of the panel assembly 506 taken along line A-A of FIG. 1. The description of the panel assembly 306 applies to the panel assembly 506 unless stated otherwise herein. In the panel assembly 506, the first actuator 340 and the second actuator 341 are replaced by a first actuator 540 and a second actuator 541. The first actuator 540 and the second actuator 541 are equivalent to the first actuator 340 and the second actuator 341 but are positioned along the inboard side 338 of the first retractable panel 335 and the second retractable panel 336, respectively, and connect the first retractable panel 335 and the second retractable panel 336 to the wheel arch wall 210 of the wheel arch 108. The respective pivot axes of the first actuator 540 and the second actuator 541 are generally horizontal and extend generally in a front to rear direction of the vehicle 100. In the extended position (FIG. 5) the first retractable panel 335 and the second retractable panel 336 are in a generally horizontal orientation and occupy the interface between the internal space 209 and the external space 203 at the wheel arch opening as previously described. During movement from the extended position to the retracted position, the first retractable panel 335 and the second retractable panel 336 pivot downward and away from the wheel assembly 104. For example, the outboard side 337 of each of the first retractable panel 335 and the second retractable panel 336 has moved downward relative to the inboard side 338 in the retracted position relative to the extended position. During movement from the retracted position to the extended position, the first retractable panel 335 and the first retractable panel 335 pivot upward and toward the wheel assembly 104.

In the illustrated implementation the first actuator 540 and the second actuator 541 are controllable powered actuators, such as electromechanical actuators. In an alternative implementation, the first actuator 540 and the second actuator 541 can be replaced by pivot joints and the first retractable panel 335 and the second retractable panel 336 can be connected to the steering mechanism 222 by linkages to drive movement of the first retractable panel 335 and the second retractable panel 336 between the extended position and the retracted position as described with respect to FIG. 4.

The panel assembly 506 is described above as a multi-part structure that includes the central portion 334, the first retractable panel 335, and the second retractable panel 336. It should be understood, however, that the components could be combined into a single panel that is configured in the manner described with respect to the first retractable panel 335 and the second retractable panel 336 and is actuated for movement between the extended and retracted positions using one or more actuators, pivot joints, and/or linkages as described with respect to the panel assembly 506.

Figure 7:
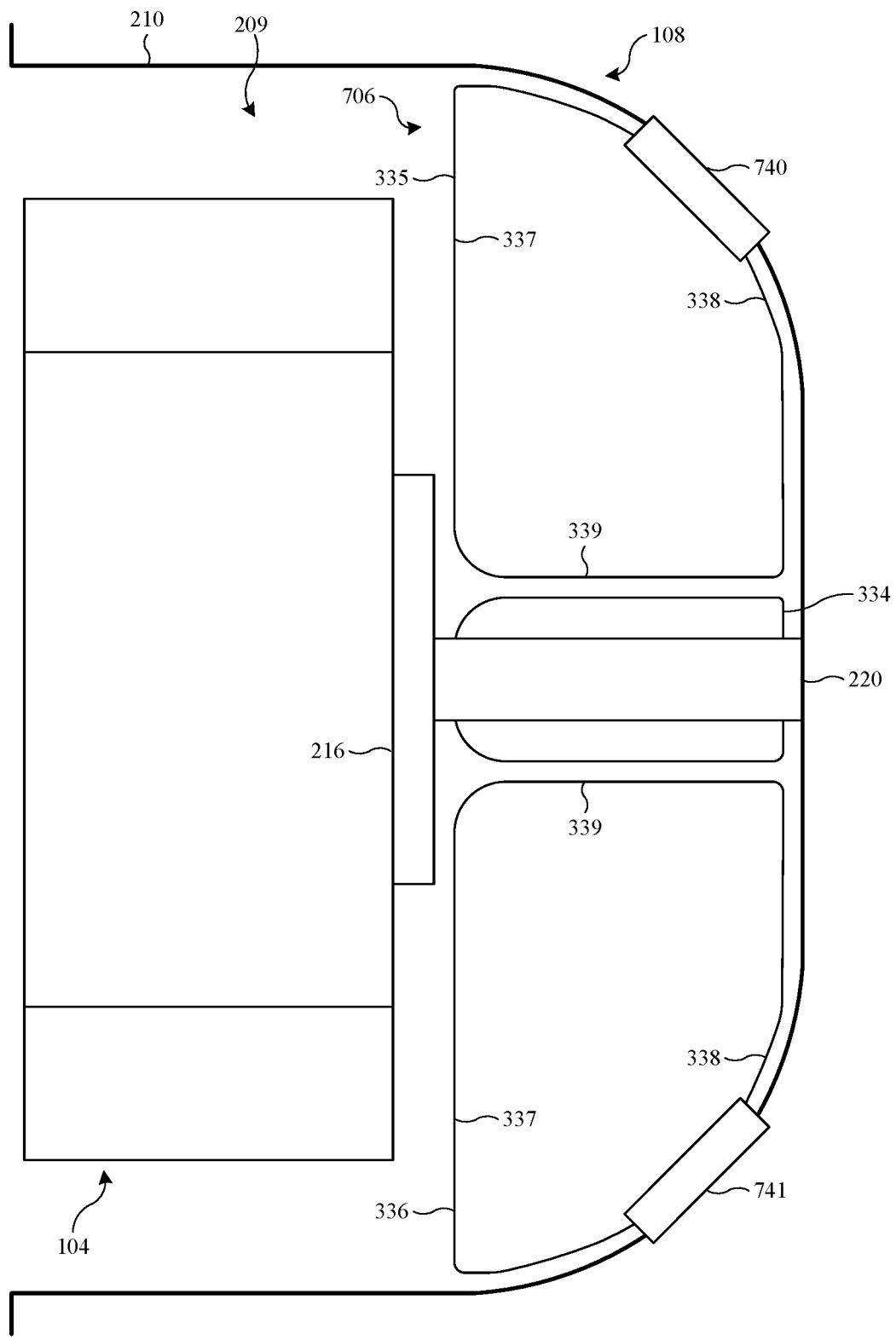
FIG. 7 is an illustration of the vehicle taken along line B-B of FIG. 1 that shows a fourth implementation of a panel.
Figure 8:
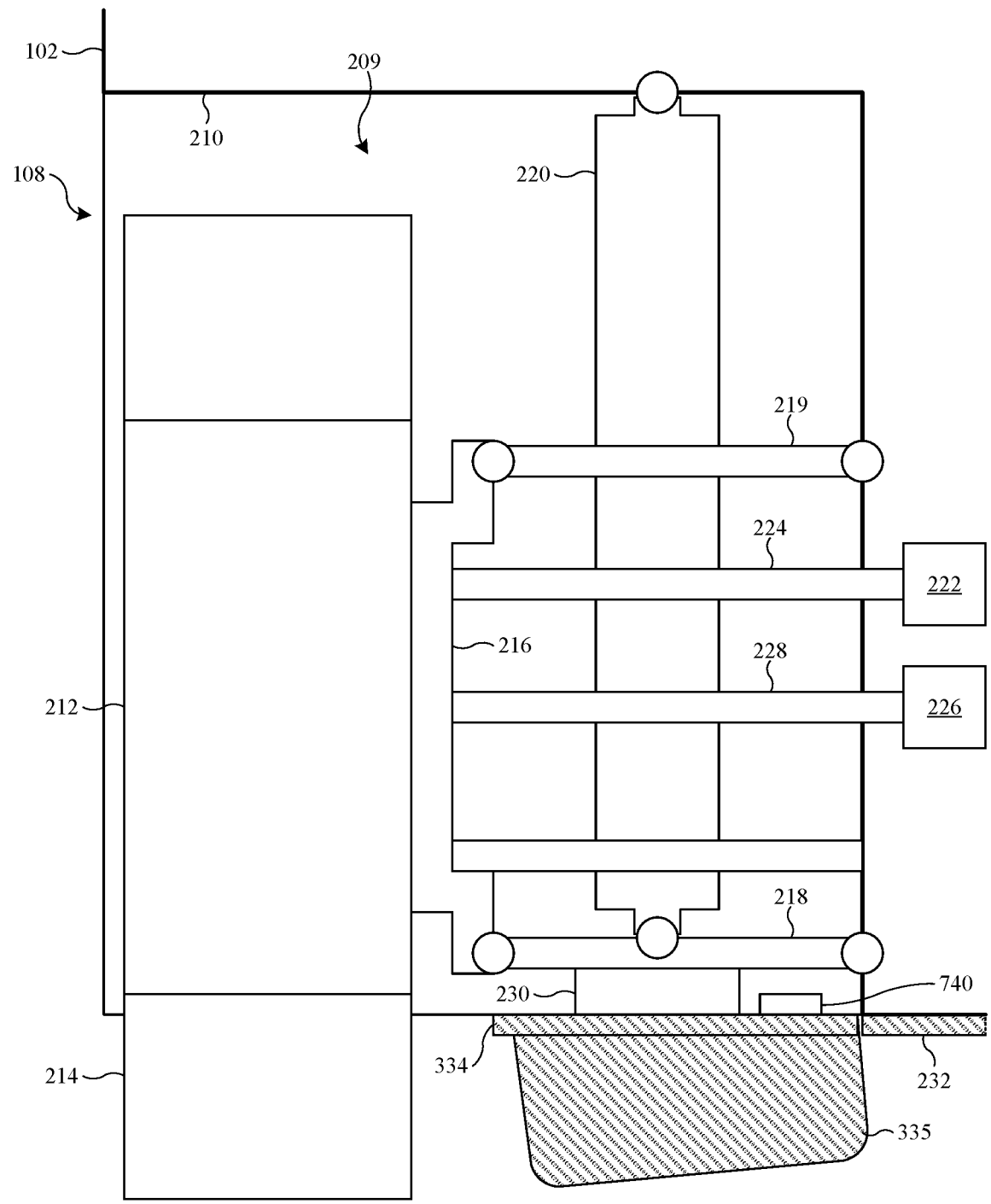
FIG. 8 is an illustration of the vehicle taken along line B-B of FIG. 1 that shows the fourth implementation of the panel.

FIG. 7 is an illustration, taken along line B-B of FIG. 1, of a panel assembly 706, which is a fourth example implementation of the panel 106. FIG. 8 is an illustration, taken along line A-A of FIG. 1 of the panel assembly 706. The description of the panel assembly 306 applies to the panel assembly 706 unless stated otherwise herein. In the panel assembly 706, the first actuator 340 and the second actuator 341 are replaced by a first actuator 740 and a second actuator 741. The first actuator 740 and the second actuator 741 are equivalent to the first actuator 340 and the second actuator 341 but are positioned at a front end of the first retractable panel 335 and at a front end of the second retractable panel 336, respectively, and connect the first retractable panel 335 and the second retractable panel 336 to the wheel arch wall 210 of the wheel arch 108. The respective pivot axes of the first actuator 740 and the second actuator 741 a are generally horizontal and extend at an angle (e.g., forty five degrees) with respect to the front to rear direction of the vehicle 100. In the extended position (FIG. 7) the first retractable panel 335 and the second retractable panel 336 are in a generally horizontal orientation and occupy the interface between the internal space 209 and the external space 203 as previously described. During movement from the extended position to the retracted position, the first retractable panel 335 and the second retractable panel 336 pivot downward and away from the wheel assembly 104. For example, the outboard side 337 of each of the first retractable panel 335 and the second retractable panel 336 has moved downward relative to the inboard side 338 in the retracted position relative to the extended position. During movement from the retracted position to the extended position, the first retractable panel 335 and the first retractable panel 335 pivot upward and toward the wheel assembly 104.

In the illustrated implementation the first actuator 740 and the second actuator 741 are controllable powered actuators, such as electromechanical actuators. In an alternative implementation, the first actuator 740 and the second actuator 741 can be replaced by pivot joints and the first retractable panel 335 and the second retractable panel 336 can be connected to the steering mechanism 222 by linkages to drive movement of the first retractable panel 335 and the second retractable panel 336 between the extended position and the retracted position as described with respect to FIG. 4.

Figure 9:
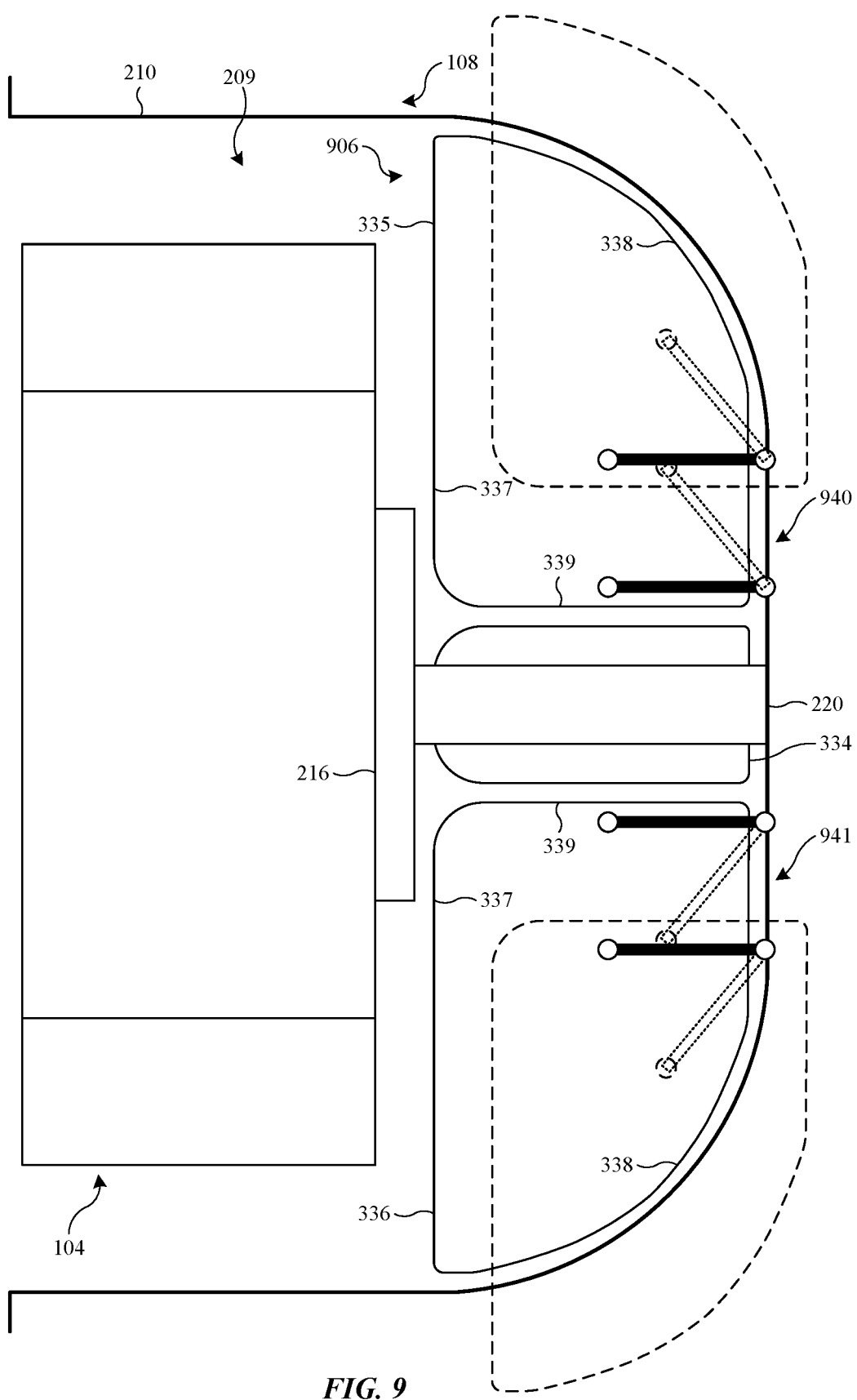
FIG. 9 is an illustration of the vehicle taken along line B-B of FIG. 1 that shows a fifth implementation of a panel.

FIG. 9 is an illustration, taken along line B-B of FIG. 1, of a panel assembly 906, which is a fifth example implementation of the panel 106. The description of the panel assembly 306 applies to the panel assembly 906 unless stated otherwise herein. In the panel assembly 906, the first actuator 340 and the second actuator 341 are replaced by a first four-bar linkage 940 and a second four-bar linkage 941. The first four-bar linkage 940 and the second four-bar linkage 941 each include two links that are each have a first end that is pivotally connected to the wheel arch wall 210 and a second end that is pivotally connected to a respective one of the first retractable panel 335 or the second retractable panel 336 of the panel assembly 906. Alternatively, the first four-bar linkage 940 and the second four-bar linkage 941 could be connected to a lateral link such as the lower control arm 218 instead of the wheel arch wall 210. The first retractable panel 335 and the second retractable panel 336 move between the extended position (solid lines) and the retracted position (broken lines) by pivoting of the links of the first four-bar linkage 940 and the second four-bar linkage 941. The first four-bar linkage 940 and the second four-bar linkage 941 may include an actuator (e.g., electromechanical) to apply rotation at one of the pivot joints of each of the first four-bar linkage 940 and the second four-bar linkage 941 or the first retractable panel 335 and the second retractable panel 336 may be connected to the steering mechanism 222 by linkages to drive movement of the first retractable panel 335 and the second retractable panel 336 between the extended position and the retracted position as described with respect to FIG. 4.

Figure 10:
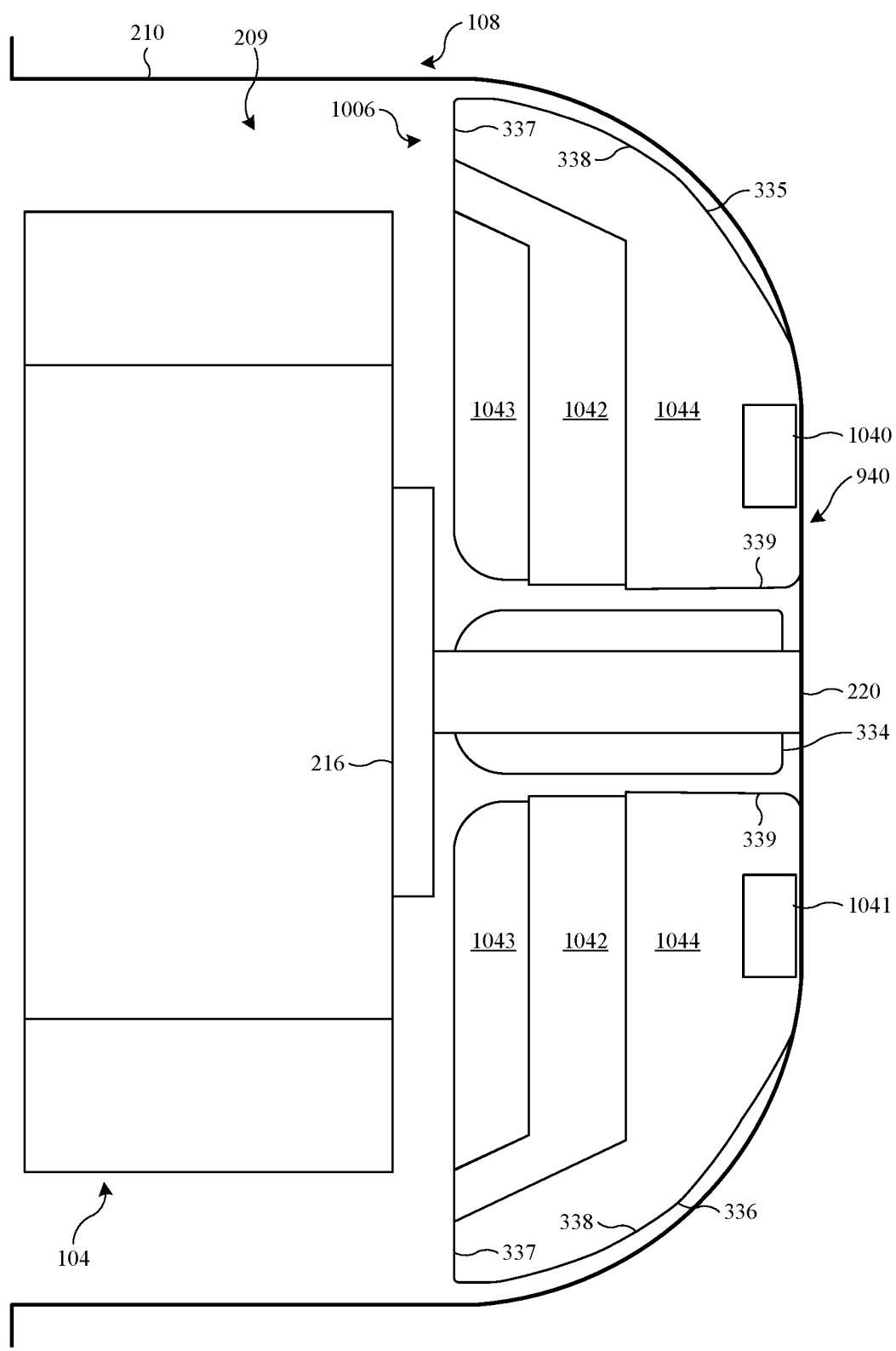
FIG. 10 is an illustration of the vehicle taken along line B-B of FIG. 1 that shows a sixth implementation of a panel in an extended position.
Figure 11:
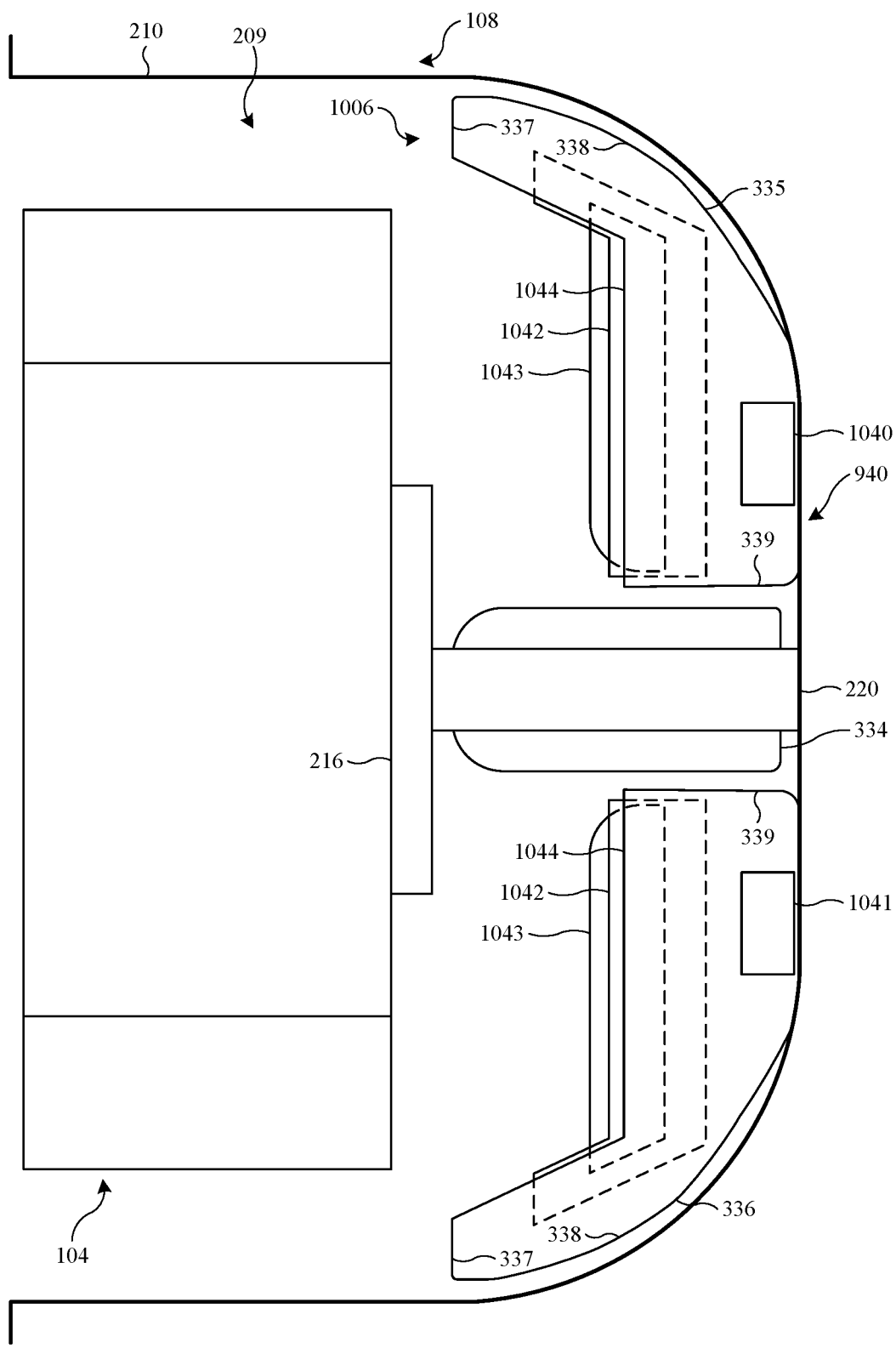
FIG. 11 is an illustration of the vehicle taken along line B-B of FIG. 1 that shows the sixth implementation of the panel in a retracted position.

FIG. 10 is an illustration, taken along line B-B of FIG. 1, of a panel assembly 1006, which is a sixth example implementation of the panel 106, in an extended position. FIG. 11 is an illustration, taken along line B-B of FIG. 1, of the panel assembly 1006 in a retracted position. The description of the panel assembly 306 applies to the panel assembly 1006 unless stated otherwise herein. In the panel assembly 1006, the first retractable panel 335 and the second retractable panel 336 move between the extended and retracted positions by relative movement of portions of each panel. In the illustrated implementation, each of the first retractable panel 335 and the second retractable panel 336 includes a first panel portion 1042, a second panel portion 1043, and a base portion 1044. The base portion 1044 may be fixedly connected to the wheel arch wall 210. The first panel portion 1042 is connected to the base portion 1044 and located outward from the base portion 1044 in the extended position. The second panel portion 1043 is connected to the first panel portion 1042 and/or to the base portion 1044 and is located outward from the base portion 1044 in the extended position. The first retractable panel 335 includes a first actuator 1040 (e.g., an electromechanical linear or rotary actuator) and the second retractable panel 336 includes a second actuator 1041 (e.g., an electromechanical linear or rotary actuator) to cause motion of the first panel portion 1042 and the second panel portion 1043 of each of the first retractable panel 335 and the second retractable panel 336 between the extended position and the retracted position.

Figure 12:
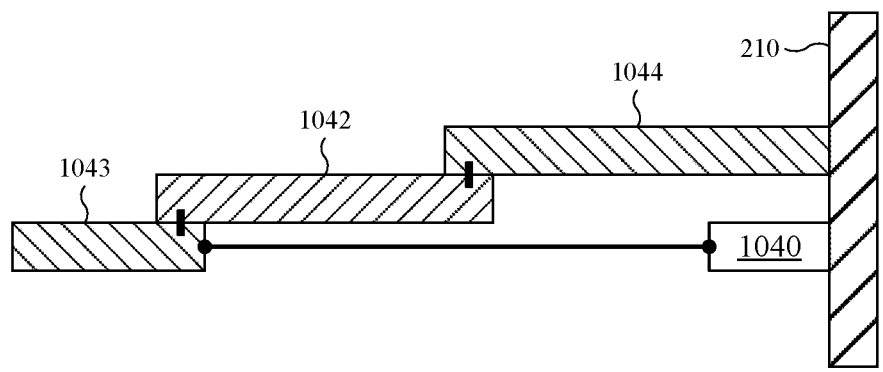
FIG. 12 shows slidingly connected panel portions.
Figure 13:
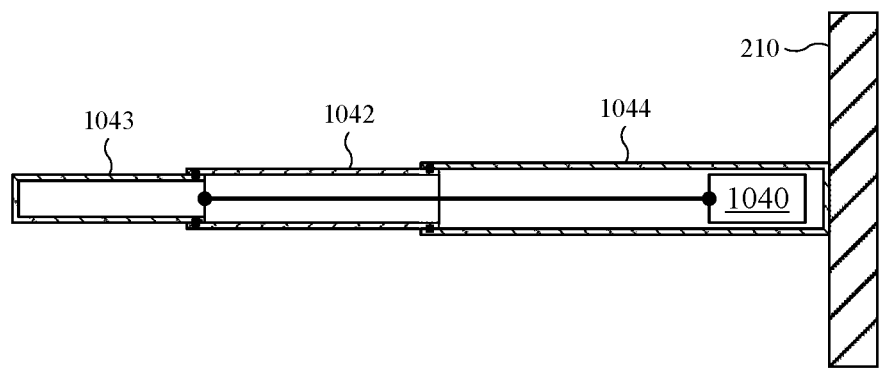
FIG. 13 shows panel portions connected in a telescopic configuration.

As one example, the first panel portion 1042, the second panel portion 1043, and the base portion 1044 may be slidingly connected to each other in a stacked configuration, as shown in FIG. 12, in which the first panel portion 1042 is configured to slide over or under the base portion 1044 during movement toward the retracted position and the second panel portion 1043 is configured to slide over or under the first panel portion 1042 during movement toward the retracted position. As another example, the first panel portion 1042, the second panel portion 1043, and the base portion 1044 may be connected to each other in a telescoping configuration (e.g., telescopically connected), as shown in FIG. 13, in which the first panel portion 1042 is configured to slide into the base portion 1044 during movement toward the retracted position and the second panel portion 1043 is configured to slide into the first panel portion 1042 during movement toward the retracted position.

In the illustrated example, the first panel portion 1042 and the second panel portion 1043 are configured to move linearly in a generally inboard direction away from the hub assembly 216 during movement from the extended position to the retracted position. As an alternative, the first panel portion 1042 and the second panel portion 1043 may be configured to pivot in a generally inboard direction away from the hub assembly 216 during movement from the extended position to the retracted position while sliding with respect to each other in a stacked configuration or in a telescoping configuration.

The foregoing implementations include a first panel portion 1042 and a second panel portion 1043. It should be understood that the second panel portion 1043 may be omitted and, alternatively, that additional panel portions can be included to extend the sliding or telescopic configuration.

In the illustrated implementation the first actuator 1040 and the second actuator 1041 are controllable powered actuators, such as electromechanical actuators. In an alternative implementation, the first actuator 1040 and the second actuator 1041 can be replaced by linkages that are connected to the steering mechanism 222 to drive movement of the first retractable panel 335 and the second retractable panel 336 between the extended position and the retracted position as described with respect to FIG. 4.

The panel assembly 1006 is described above as a multi-part structure that includes the central portion 334, the first retractable panel 335, and the second retractable panel 336. It should be understood, however, that the components could be combined into a single panel that is configured in the manner described with respect to the first retractable panel 335 and the second retractable panel 336 and is actuated for movement between the extended and retracted positions using one or more actuators, pivot joints, and/or linkages as described with respect to the panel assembly 1006.

Figure 14:
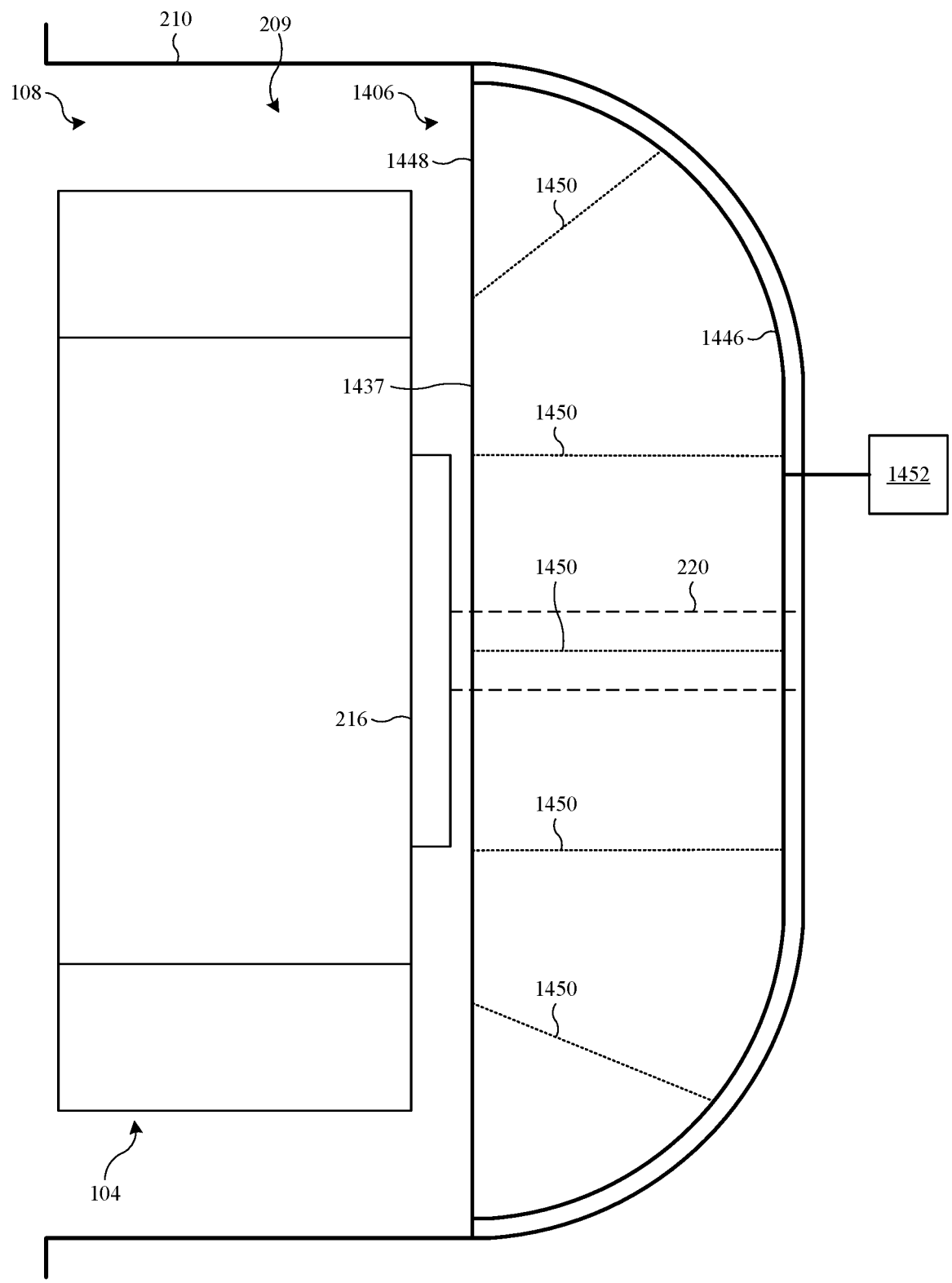
FIG. 14 is an illustration of the vehicle taken along line B-B of FIG. 1 that shows a seventh implementation of a panel in an extended position.
Figure 15:
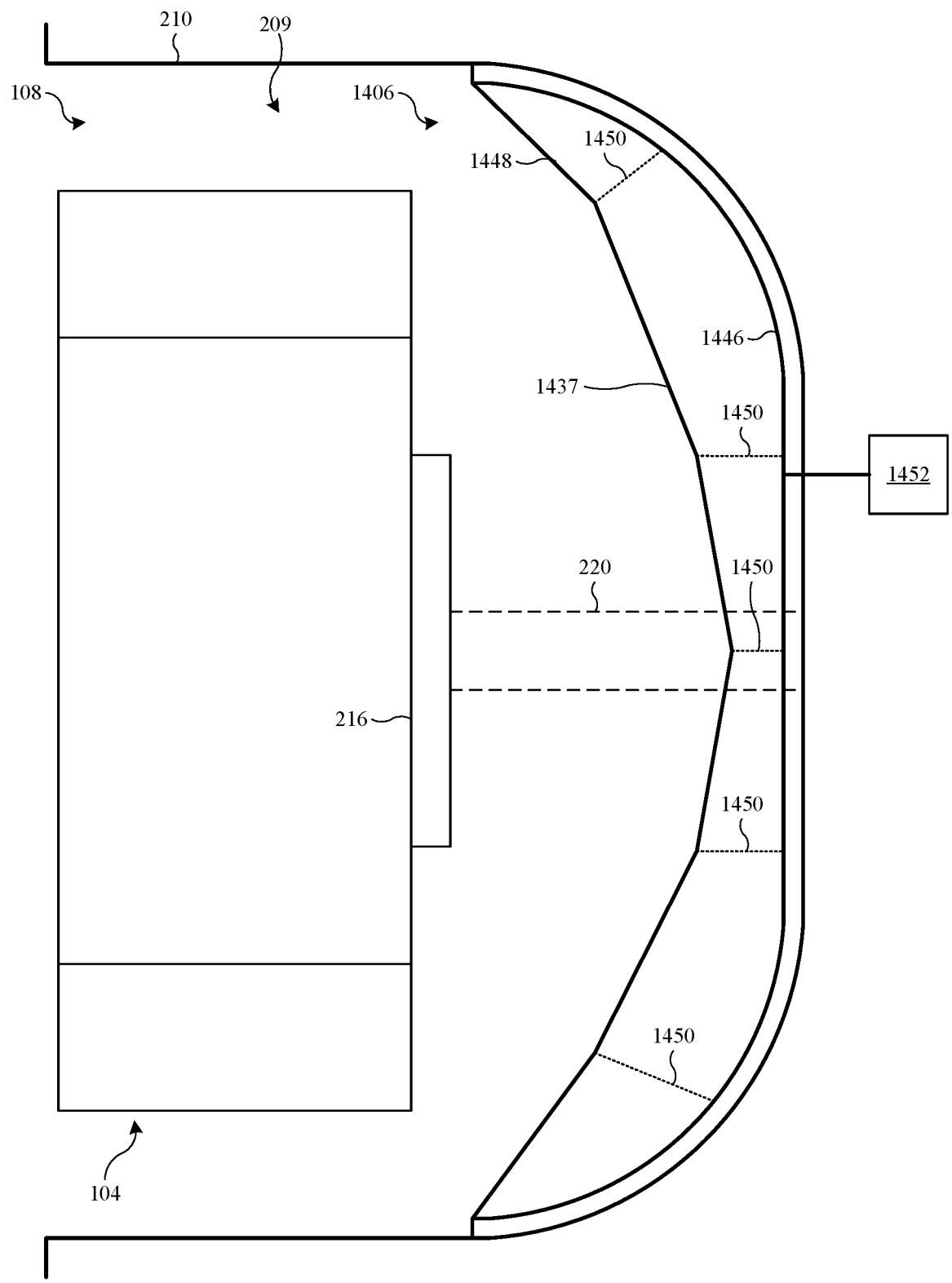
FIG. 15 is an illustration of the vehicle taken along line B-B of FIG. 1 that shows the seventh implementation of the panel in a retracted position.

FIG. 14 is an illustration, taken along line B-B of FIG. 1, of a panel 1406, which is a seventh example implementation of the panel 106, in an extended position. FIG. 15 is an illustration, taken along line B-B of FIG. 1, of the panel 1406 in a retracted position. The description of the panel assembly 306 applies to the panel 1406 unless stated otherwise herein. The panel 1406 is a single panel structure in the illustrated implementation, but could instead include multiple panels that are equivalent to the panel 1406 and arranged, for example, in the manner described with respect to the first retractable panel 335 and the second retractable panel 336.

The panel 1406 includes a base portion 1446, an inflatable portion 1448 (which may also be referred to as an inflatable panel), tension members 1450, and an inflator 1452. The base portion 1446 is connected to a portion of the vehicle body 102 either directly or by connection to a structure that is connected to the vehicle body 102. In the illustrated implementation, the base portion 1446 is connected to the wheel arch wall 210 in the illustrated implementation. The base portion 1446 serves to support the inflatable portion 1448 and connect the inflatable portion 1448 to the vehicle body 102. The inflatable portion 1448 is a flexible and inflatable structure that functions to obstruct air flow into the internal space 209 of the wheel arch 108 in the extended position, as previously described with respect to the panel 106 and the panel assembly 306. For example, in the extended position, the inflatable portion 1448 of the panel 1406 extends generally inboard from the wheel arch wall 210 and the base portion 1446 toward the wheel assembly 104. The inflatable portion 1448 includes an outboard side 1437 that is located adjacent to the wheel assembly 104 in the extended position and is moved inboard, away from the wheel assembly 104, to define the retracted position, which provides space for pivoting of the wheel assembly 104 during steering.

The panel 1406 is moved between the extended and retracted positions by the inflator 1452. The inflator 1452 supplies air (or another gas) to the inflatable portion 1448 to pressurize and expand the inflatable portion 1448 in order to move the panel 1406 to the extended position from the retracted position. Air is expelled from the inflatable portion 1448 in order to deflate the inflatable portion 1448 and move the panel 1406 to the retracted position. The inflator 1452 either permits deflation (e.g., by venting) or actively pumps air out of the inflatable portion 1448 to move the inflatable portion 1448 from the extended position to the retracted position. The inflator 1452 may be an actively controlled component or a passive component. In an actively controlled implementation, the inflator 1452 is a pump (e.g., an electrically operated pump) that is controllable by a control signal to inflate and deflate or vent the inflatable portion 1448 to cause the panel 1406 to move between the extended and retracted positions. In a passively controlled component, the inflator 1452 includes an air intake and a duct that connects that air intake to the inflatable portion 1448. In this implementation the air intake functions as an air scoop that directs air to the inflatable portion 1448 as a function of vehicle speed as a result of changing air pressures and flows at the air scoop as a function of vehicle speed. Thus, air is directed into the inflatable portion 1448 by the air intake of the inflator 1452 when a vehicle speed of the vehicle 100 is above a threshold speed, and air is not directed into the inflatable portion 1448 by the air intake of the inflator 1452 when a vehicle speed of the vehicle 100 is above a below the threshold speed to allow venting.

Figure 16:
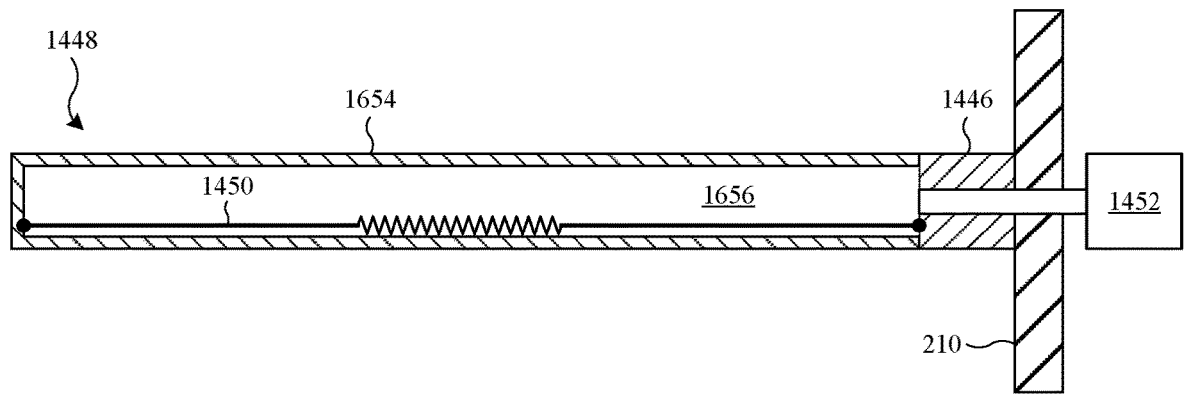
FIG. 16 shows an inflatable portion of the panel of FIG. 14 in the extended position.
Figure 17:
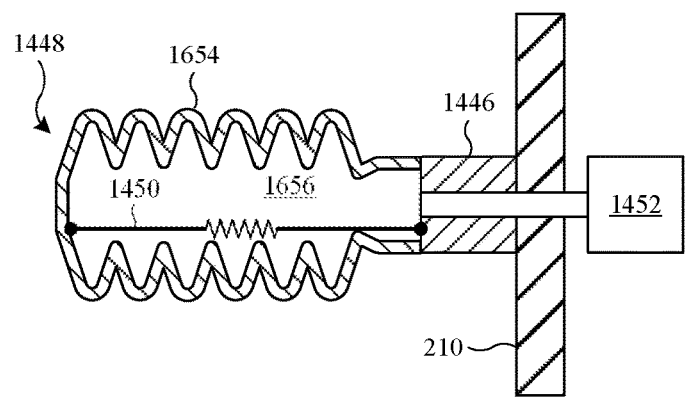
FIG. 17 shows the inflatable portion of the panel of FIG. 14 in the retracted position.

The inflatable portion 1448 may include a flexible bladder 1654 that defines an interior space 1656 as shown in FIG. 16, in which the inflatable portion 1448 is in the extended position, and as shown in FIG. 17, in which the inflatable portion 1448 is in the retracted position. The flexible bladder 1654 is a flexible structure and may be elastic or inelastic. The tension members 1450 extend from the base portion 1446 to the outboard side 1437 to urge the outboard side 1437 toward the base portion 1446 and therefore away from the wheel assembly 104 and toward the retracted position while air (or another gas) is expelled from the inflatable portion 1448. In the extended position, air pressure inside the interior space 1656 resists the force exerted by the tension members 1450 and maintains the panel 1406 in the extended position (FIG. 16). When the air pressure is vented, released, or otherwise reduced, the force applied to the flexible bladder 1654 by the tension members 1450 will overcome the air pressure and cause the flexible bladder 1654 to collapse (FIG. 17). The tension members 1450 are configured to urge the flexible bladder 1654 to collapse toward the retracted position, and any suitable material or structure can be used. As one example, the tension members 1450 may be elastic cords. As another example, the tension members 1450 may be cords or straps that attached to springs. The tension members 1450 are located inside the interior space 1656 of the flexible bladder 1654 in the illustrated example, but may alternatively be located on an exterior surface of the inflatable portion 1448.

Multiple panels that are equivalent to the panel 1408 may be provided, and those panels may be separately controlled so that each can be inflated and deflated in accordance with control signals determined based on steering angles, suspension travel, predicted conditions, and other factors. In addition, the panel 1408 may also include multiple inflatable portions that are each equivalent to the inflatable portion 1448 in order to allow independent inflation and deflation of individual sections of the panel 1408 that each correspond to a separate inflatable portion.

Figure 18:
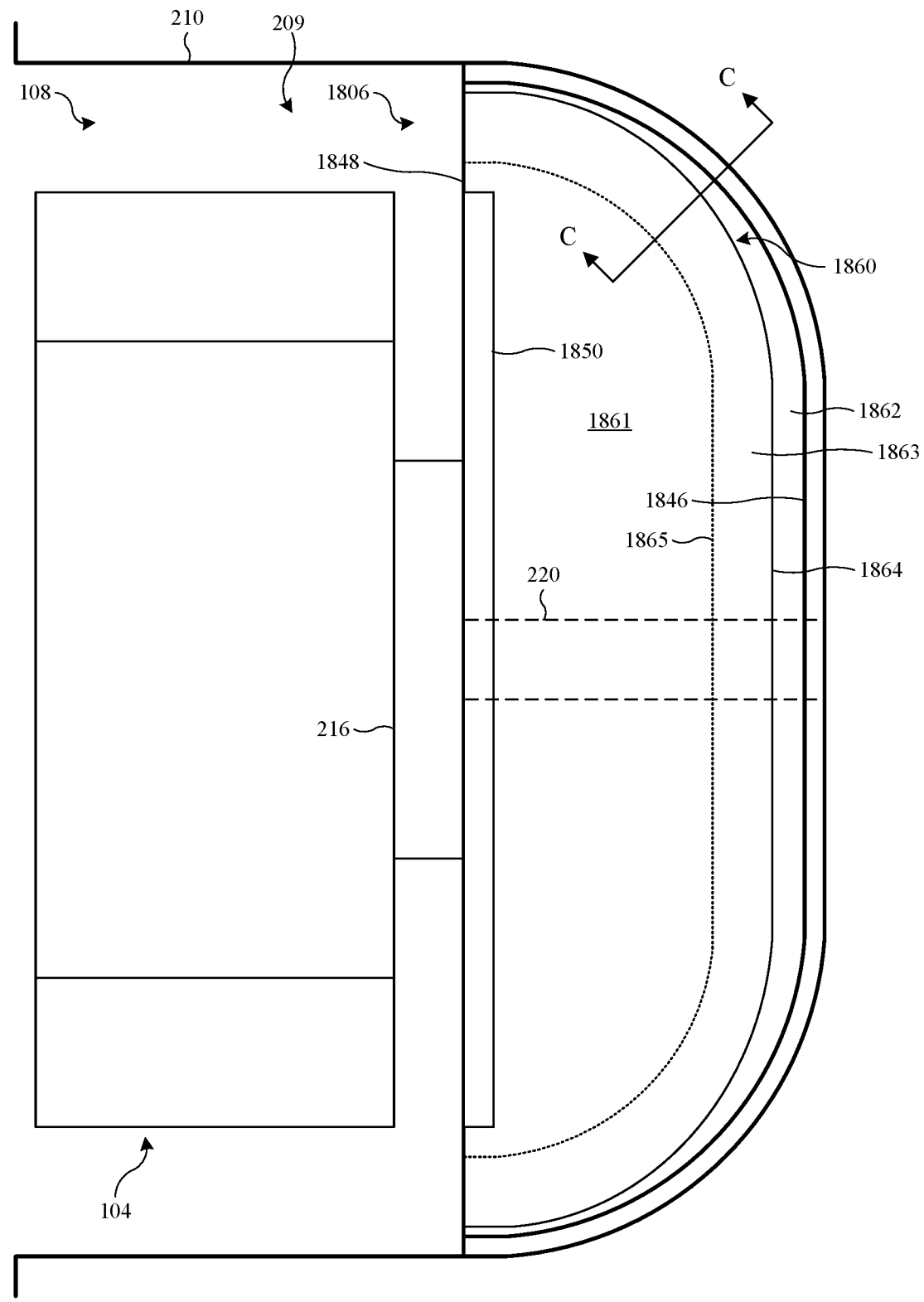
FIG. 18 is an illustration of the vehicle taken along line B-B of FIG. 1 that shows an eighth implementation of a panel assembly in an extended position.
Figure 19:
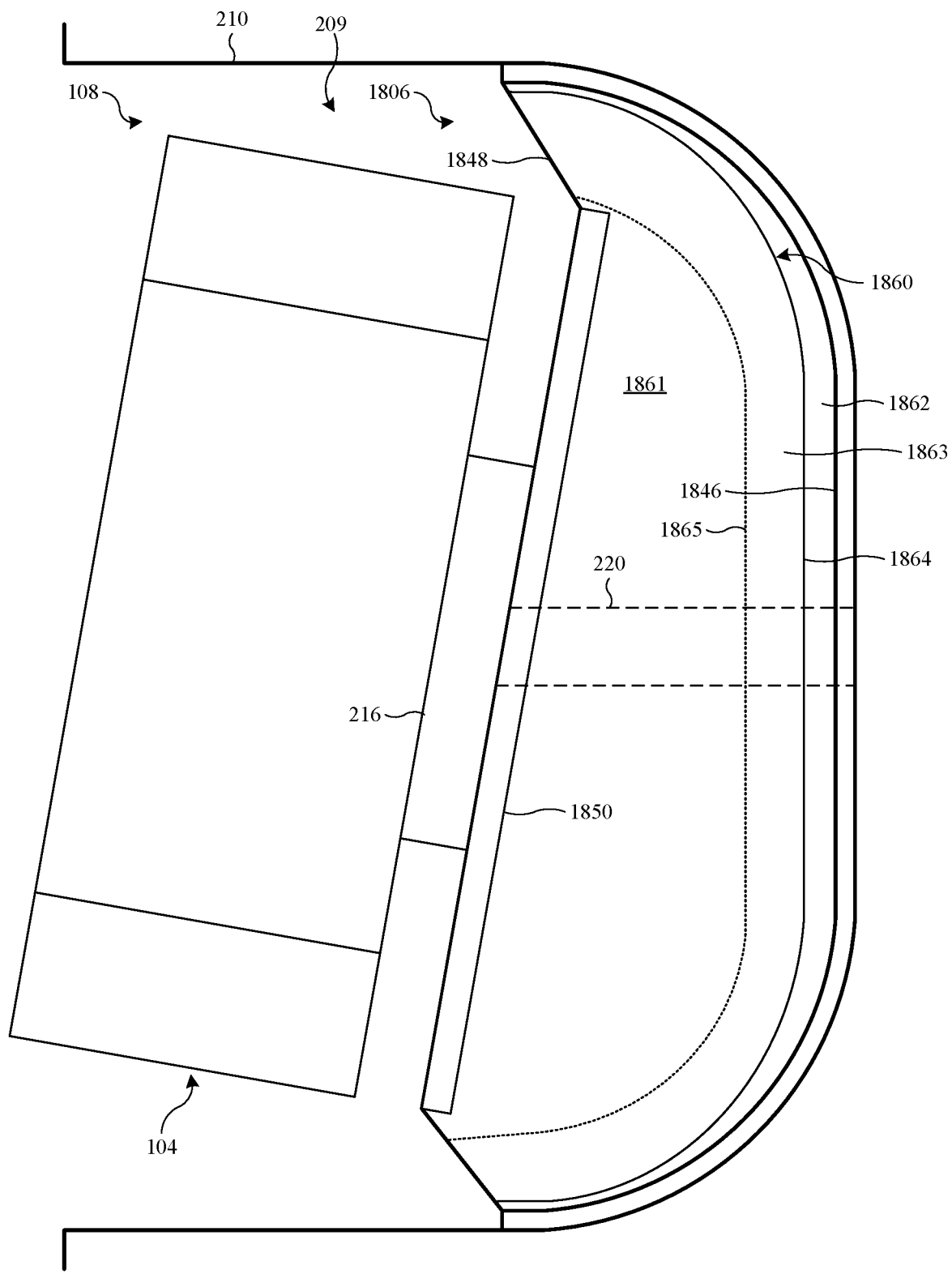
FIG. 19 is an illustration of the vehicle taken along line B-B of FIG. 1 that shows the eighth implementation of the panel assembly in a retracted position.

FIG. 18 is an illustration, taken along line B-B of FIG. 1, of a panel assembly 1806, which is an eighth example implementation of the panel 106, in an extended position (which may also be referred to as a neutral position). FIG. 19 is an illustration, taken along line B-B of FIG. 1, of the panel assembly 1806 in a retracted position (which may also be referred to as a turning position or a deformed position). The description of the panel assembly 306 applies to the panel assembly 1806 unless stated otherwise herein. The panel assembly 1806 is a flexible structure that is connected to the hub assembly 216 or another portion of the wheel assembly 104 that pivots during steering and is also connected, directly or indirectly, to part of the vehicle body 102, such as the wheel arch wall 210. Steering movement of the wheel assembly 104 causes deformation of the panel assembly 1806, thereby allowing the panel assembly 1806 to obstruct entry of air into the internal space 209 from the external space 203, without obstructing turning movement of the wheel assembly 104.

The panel assembly 1806 includes a base portion 1846, a flexible panel 1848, and a wheel anchor portion 1850. The base portion 1846 is connected to a portion of the vehicle body 102 either directly or by connection to a structure that is connected to the vehicle body 102. In the illustrated implementation, the base portion 1846 is connected to the wheel arch wall 210 in the illustrated implementation. The wheel anchor portion 1850 is connected to the hub assembly 216 or to another component that turns in correspondence with steering of the wheel assembly 104. The flexible panel 1848 extends between and is connected to the base portion 1846 and the wheel anchor portion 1850. When the wheel assembly 104 turns, the wheel anchor portion 1850 pivots with respect to the base portion 1846, which causes deformation of the flexible panel 1848.

Figure 20:
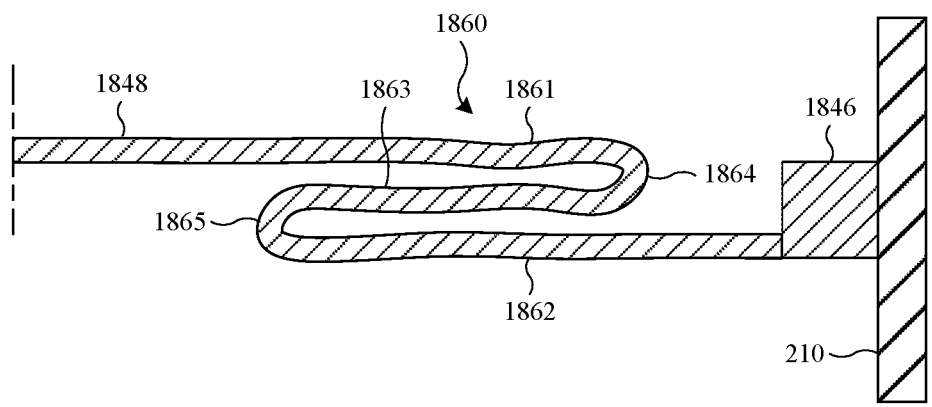
FIG. 20 is an illustration that shows a rolling lobe assembly of a flexible panel of the panel assembly of FIG. 19 in the extended position.
Figure 21:
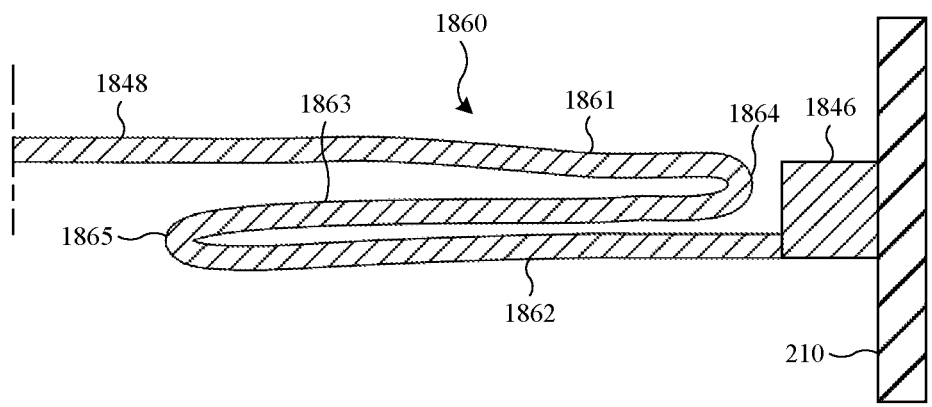
FIG. 21 is an illustration that shows the rolling lobe assembly of the flexible panel of the panel assembly of FIG. 19 in the retracted position.

The flexible panel 1848 is a thin sheet material that is flexible and may be elastic or inelastic. The flexible panel 1848 includes a rolling lobe configuration 1860 that facilitates deformation of the flexible panel 1848 during steering movement of the wheel assembly 104 and during elevational movement of the wheel assembly 104. FIG. 20 is a cross section view of the rolling lobe configuration 1860 of the flexible panel 1848 in the extended position, and FIG. 21 is a cross section view of the rolling lobe configuration 1860 of the flexible panel 1848 in the retracted position. An outboard portion 1861 of the flexible panel 1848 that is located between the rolling lobe configuration 1860 and the wheel anchor portion 1850. An inboard portion 1862 of the flexible panel 1848 is located between the rolling lobe configuration 1860 and the base portion 1846. The rolling lobe configuration 1860 includes an intermediate portion 1863 of the flexible panel 1848 that is located between a first lobe 1864 and a second lobe 1865 of the rolling lobe configuration 1860.

The outboard portion 1861 extends from the wheel anchor portion 1850 to the first lobe 1864. The first lobe 1864 is between the outboard portion 1861 and the intermediate portion 1863 and defines a substantially one-hundred and eighty degree turn between them, turning from the inboard direction to the outboard direction. The intermediate portion 1863 extends in the outboard direction from the first lobe 1864 toward the second lobe 1865. The second lobe 1865 is between the intermediate portion 1863 and the inboard portion 1862 and defines a substantially one-hundred and eighty degree turn between them, turning from the outboard direction to the inboard direction, followed by the inboard portion 1862, which extends to the base portion 1846 in the inboard direction. This configuration is an example, and the orientation of the rolling lobe configuration 1860 could be reversed.

During turning of the wheel assembly 104 the flexible panel 1848 "rolls" at the first lobe 1864 and the second lobe 1865. This allows the length of the intermediate portion 1863 of the lobe configuration 1860 to increase and decrease during turning of the wheel assembly 104. In this manner, the panel assembly 1806 can compress and expand smoothly during movement between the extended position and the retracted position.

The flexible panel 1848 of the panel assembly 1806 may be configured so that it can be retracted in order to remove debris that may otherwise accumulate on the top surface of the flexible panel 1848. For example, the outboard portion 1861 may be retracted toward the inboard portion 1862 manually or using an actuator.

Figure 22:
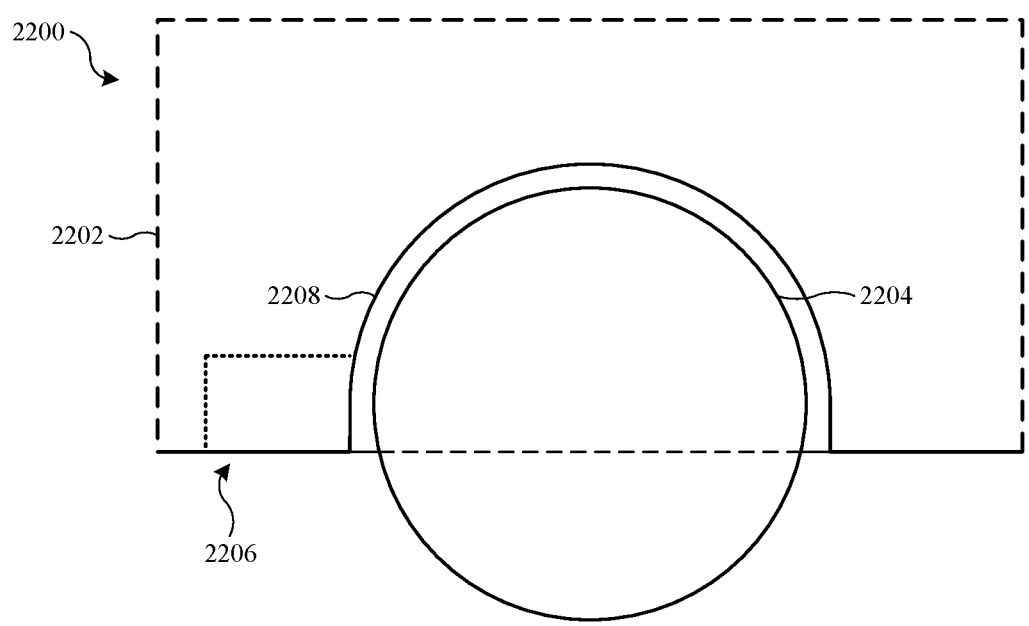
FIG. 22 is an illustration of a vehicle according to an alternative implementation.

FIG. 22 is an illustration of a vehicle 2200 according to an alternative implementation. The vehicle 2200 may be a conventional road-going vehicle that is supported by wheels and tires (e.g., four wheels and tires). The vehicle 2200 may be a passenger vehicle that includes a passenger compartment that is configured to carry one or more passengers. The vehicle 2200 may be a cargo vehicle that is configured to carry cargo items in a cargo compartment.

In the illustrated implementation, the vehicle 2200 includes a vehicle body 2202, a wheel assembly 2204 (e.g., including a wheel and tire), and an adjustable aerodynamic assembly 2206 that is configured to move between a retracted position and an extended position. The adjustable aerodynamic assembly 2206 is positioned in front of a wheel arch 2208 (which may also be referred to as a wheelhouse), and is configured to deflect air flow when in the extended position to reduce the amount of air that enters the wheel arch 2208.

Figure 23:
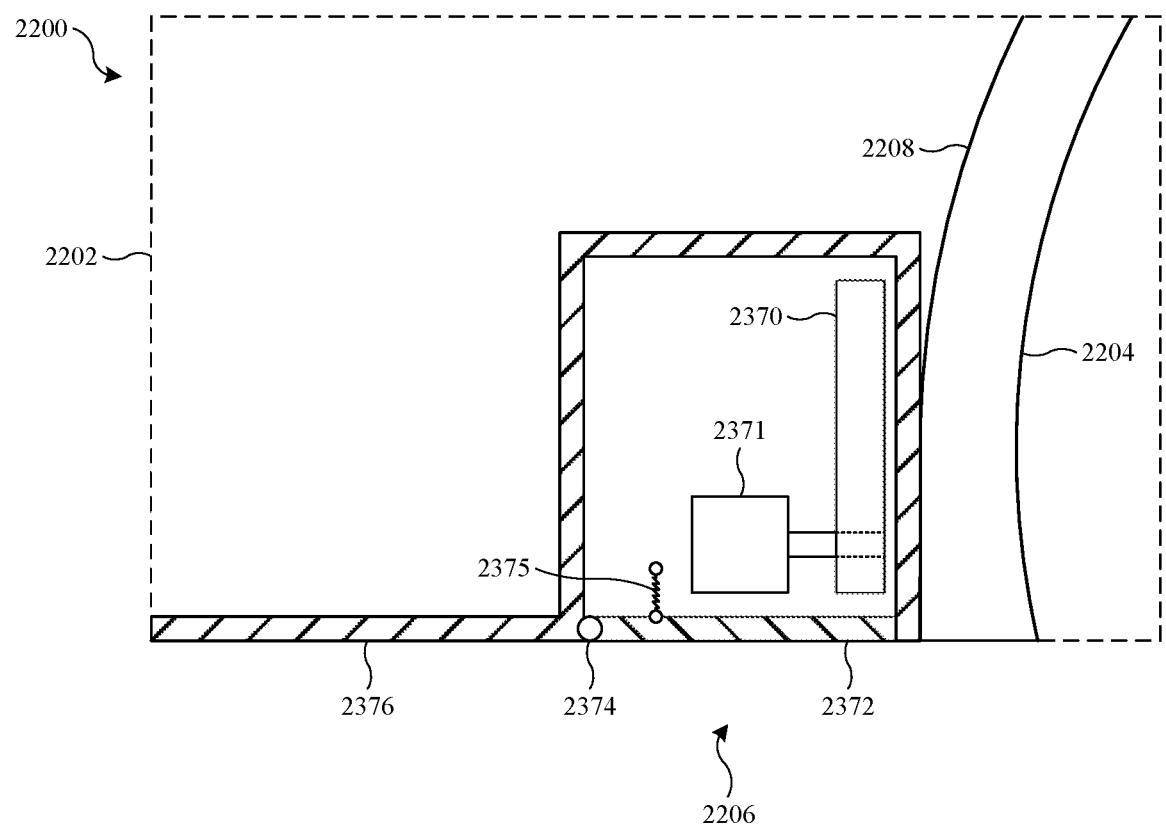
FIG. 23 is an illustration of an adjustable aerodynamic assembly in a retracted position.
Figure 24:
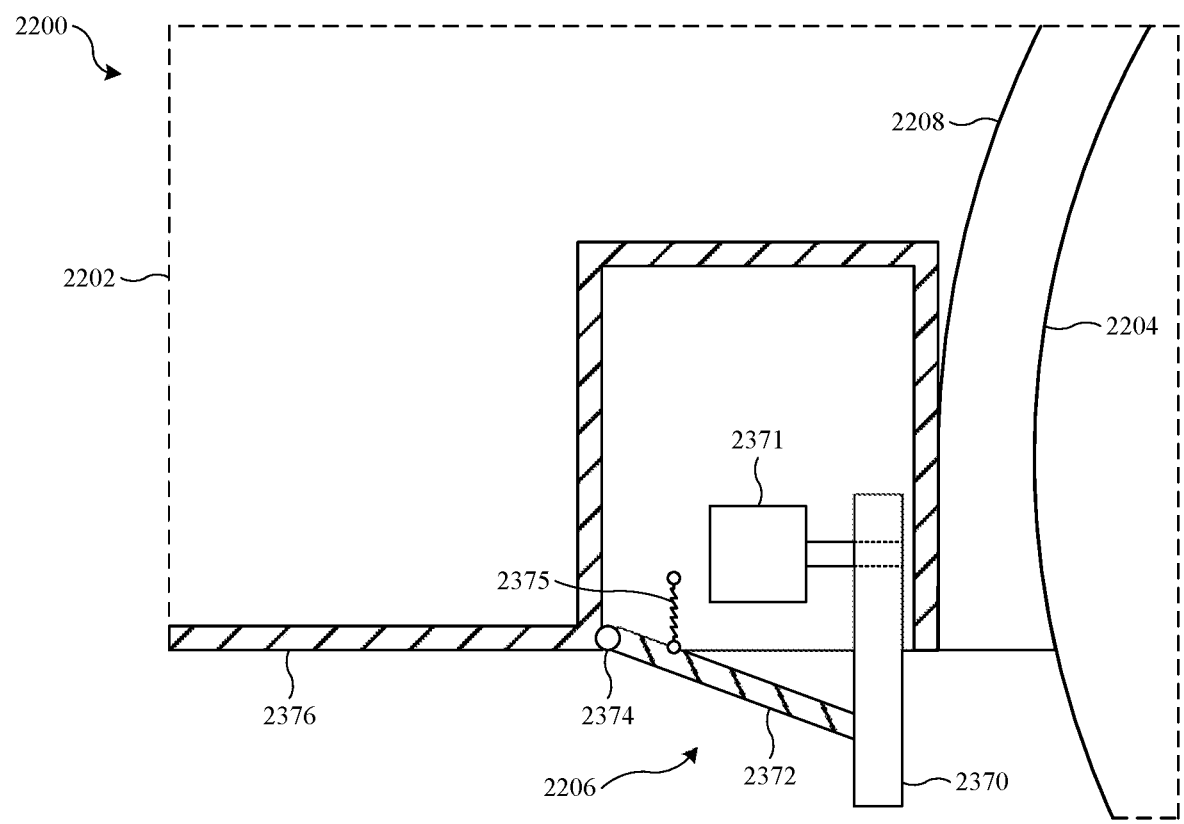
FIG. 24 is an illustration of the adjustable aerodynamic assembly in an extended position.

FIG. 23 is an illustration of the adjustable aerodynamic assembly 2206 in the retracted position, and FIG. 24 is an illustration of the adjustable aerodynamic assembly 2206 in the extended position. The adjustable aerodynamic assembly 2206 includes a flap 2370, an actuator assembly 2371, and a closure panel 2372.

The flap 2370 is located in a housing 2373 that is connected to, located in, and/or defined by the vehicle body 2202. The housing 2373 is located forward from the wheel arch 2208. The flap 2370 may be completely inside the housing 2373 and isolated from airflow outside the housing in the retracted position, and may extend downward out of the housing 2373 in the extended position in order to disrupt airflow in front the of the wheel assembly 2204 in the extended position, by virtue of its position in from the wheel assembly 2204 and the wheel arch 2208.

An interior of the housing 2373 is separated from the outside environment when closed. The closure panel 2372 is connected to the housing 2373 and/or the vehicle body 2202, such as by a pivot joint 2374, to allow movement of the closure panel 2372 between a closed position (FIG. 23) and an open position (FIG. 24) to open and close the housing 2373. In the illustrated implementation, the closure panel 2372 is urged toward the closed position by a spring force, which is applied by a spring 2375 that is operably connected to the closure panel 2372 in a suitable manner.

In the closed position, the closure panel 2372 blocks access to the interior of the housing 2373, and is positioned such that it is generally coincident with (e.g., aligned with) adjacent surfaces of the vehicle body 2202, such as a lower surface 2376 thereof, which may be a lower surface of a bumper or other portion of the vehicle body 2202 that is positioned forward from the wheel assembly 2204 and the wheel arch 2208. In the open position, the closure panel 2372 is angled downward relative to the adjacent surfaces of the vehicle body 2202, in order to allow the flap 2370 to extend downward out of the housing 2373 and downward relative to the closure panel 2372 as well.

The actuator assembly 2371 is configured to support the flap 2370 relative to the housing 2373 and to cause movement of the flap 2370 between the retracted position and the extended position. As an example, the actuator assembly 2371 may support the flap 2370 such that the flap 2370 pivots relative to the housing 2373 and the vehicle body 2202 during movement between the retracted position and the extended position. As examples, the actuator assembly 2371 may be implemented using electromechanical actuator components, such as a rotary electric motor or a linear electric actuator (e.g., a screw drive or a linear motor), which may be used in combination with structures that are used to guide and constrain motion of the flap 2370, such as joints, tracks, sliding structures, and other conventional components. The actuator assembly 2371 may be configured to move the flap 2370 other than by pivoting. For example, the actuator assembly may be configured to cause the flap 2370 to translate between the retracted position and the extended position.

As the flap 2370 moves from the retracted position toward the extended position, engagement of the flap 2370 with the closure panel 2372 causes the closure panel 2372 to move from the closed position to the open position. For example, the closure panel 2372 may move from the closed position to the open position by pivoting at the pivot joint 2374 against the force of the spring 2375, and may return to the closed position according to the force applied by the spring 2375 as the flap 2370 returns to the retracted position from the extended position. Thus, the actuator assembly 2371 may be configured to move the flap 2370 between the retracted position and the extended position, and the closure panel 2372 is moved from the closed position to open position by engagement of the flap 2370 with the closure panel 2372 during movement of the flap 2370 from the retracted position to the extended position. Alternatively, the closure panel 2372 may be actively moved, for example, by configuring the actuator assembly 2371 or a separate actuator to cause movement of the closure panel 2372.

Figure 25:
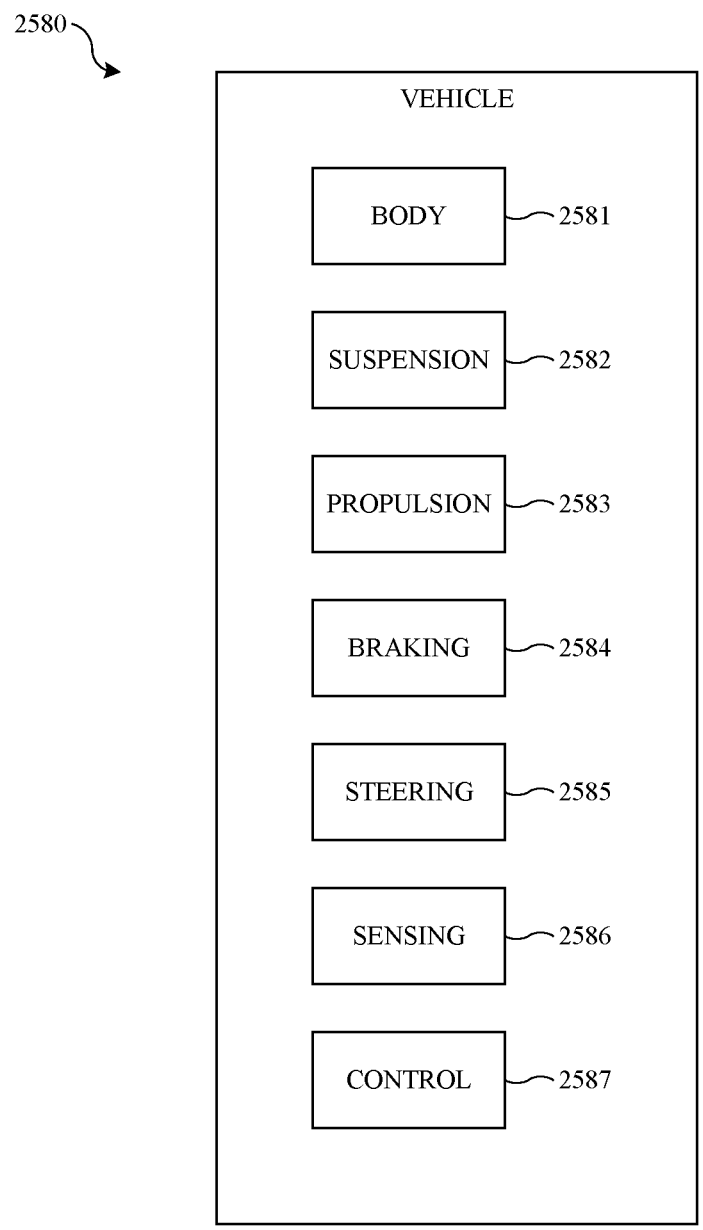
FIG. 25 is a block diagram that shows a vehicle.

FIG. 25 is a block diagram that shows an example implementation of a vehicle 2580, which can be used to implement the vehicle 100. In the illustrated implementation, the vehicle 2580 includes a vehicle body 2581, a suspension system 2582, a propulsion system 2583, a braking system 2584, a steering system 2585, a sensing system 2586, and a control system 2587. These are examples of vehicle systems that are included in the vehicle 2580. Other systems can be included in the vehicle 2580.

The vehicle body 2581 is a structural component of the vehicle 2580 through which other components are interconnected and supported. The vehicle body 2581 may, for example, include or define a passenger compartment for carrying passengers. The vehicle body 2581 may include structural components (e.g., a frame, subframe, unibody, monocoque, etc.) and aesthetic components (e.g., exterior body panels).

The suspension system 2582 supports a sprung mass of the vehicle 2580 with respect to an unsprung mass of the vehicle 2580. The suspension system 2582 is an active suspension system that is configured to control generally vertical motion of the wheels. Broadly speaking, the suspension system 2582 controls vertical motion of the wheels of the vehicle 2580 relative to the vehicle body 2581, for example, to ensure contact between the wheels and a surface of a roadway and to reduce undesirable movements of the vehicle body 2581. The suspension system 2582 includes components (e.g., actuators) that are configured to transfer energy into and absorb energy from the wheels, such as by applying upward and downward forces to introduce energy into and absorb energy from the wheels. The components of the suspension system 2582 may be operated in accordance with signals from sensors in the sensing system 2586 and under control from the control system 2587, for example, in the form of commands transmitted from the control system 2587 to the suspension system 2582.

The propulsion system 2583 includes propulsion components that are configured to cause motion of the vehicle 2580 (e.g., accelerating the vehicle 2580). The propulsion system 2583 may include components such that are operable to generate torque and deliver that torque to one or more wheels (e.g., road wheels that contact the road through tires mounted on the road wheels). Examples of components that may be included in the propulsion system 2583 include motors, gearboxes, and propulsion linkages (e.g., drive shafts, half shafts, etc.). Motors included in the propulsion system 2583 may be, as examples, an internal combustion engine powered by a combustible fuel or one or more electric motors that are powered by electricity (e.g., from a battery). Electric motors that are included in the propulsion system 2583 may further be configured to operate as generators that charge the battery in a regenerative braking configuration.

The braking system 2584 provides deceleration torque for decelerating the vehicle 2580. The braking system 2584 may include friction braking components such as disk brakes or drum brakes. The braking system 2584 may use an electric motor of the propulsion system to decelerate the vehicle by electromagnetic resistance, which may be part of battery charging in a regenerative braking configuration.

The steering system 2585 is operable to cause the vehicle to turn by changing a steering angle of one or more wheels of the vehicle 2580. As one example, one or more wheels of the vehicle may each include an independently operated steering actuator. As another example, two wheels of the vehicle 2580 may be connected by steering linkages to a single steering actuator or to a manually operated steering device.

The sensing system 2586 includes sensors for observing external conditions of the environment around the vehicle 2580 (e.g., location of the roadway and other objects) and conditions of the vehicle 2580 (e.g., acceleration and conditions of the various systems and their components). The sensing system 2586 may include sensors of various types, including dedicated sensors and/or components of the various systems. For example, actuators may incorporate sensors or portions of actuators may function as sensors such as by measuring current draw of an electric motor incorporated in an actuator. The suspension system 2582 may, for example, be controlled using acceleration sensors that are connected to a sprung mass of the vehicle 2580, to an unsprung mass of the vehicle 2580, and/or to one or more suspension actuators of the vehicle 2580.

The control system 2587 includes communication components (i.e., for receiving sensor signals and sending control signals) and processing components (i.e., for processing the sensor signals and determining control operations), such as a controller. The control system 2587 may be a single system or multiple related systems. For example, the control system 2587 may be a distributed system including components that are included in other systems of the vehicle 2580, such as the suspension system 2582, the propulsion system 2583, the braking system 2584, the steering system 2585, the sensing system 2586, and/or other systems.

The control system 2587 may control operation of the panel 106 and other panel implementations described herein for separating the internal space 209 of the wheel arch 108 from the external space 203 under the vehicle body 102 of the vehicle 100. Operation of the panel 106 may be controlled based on vehicle speed (e.g., comparison to a threshold), vehicle location corresponding to limited access highway or local street as determined using navigation map information, an anticipated turn using navigation data or autonomous control data, an actual turn based on a sensed turning angle or turning command, sensed conditions ahead of the vehicle 2580 such as upcoming roadway features that could cause suspension travel (e.g., bumps, potholes, etc., ahead of the vehicle 2580 determined by interpreting sensor outputs from the sensing system 2586), or other factors.

Figure 26:
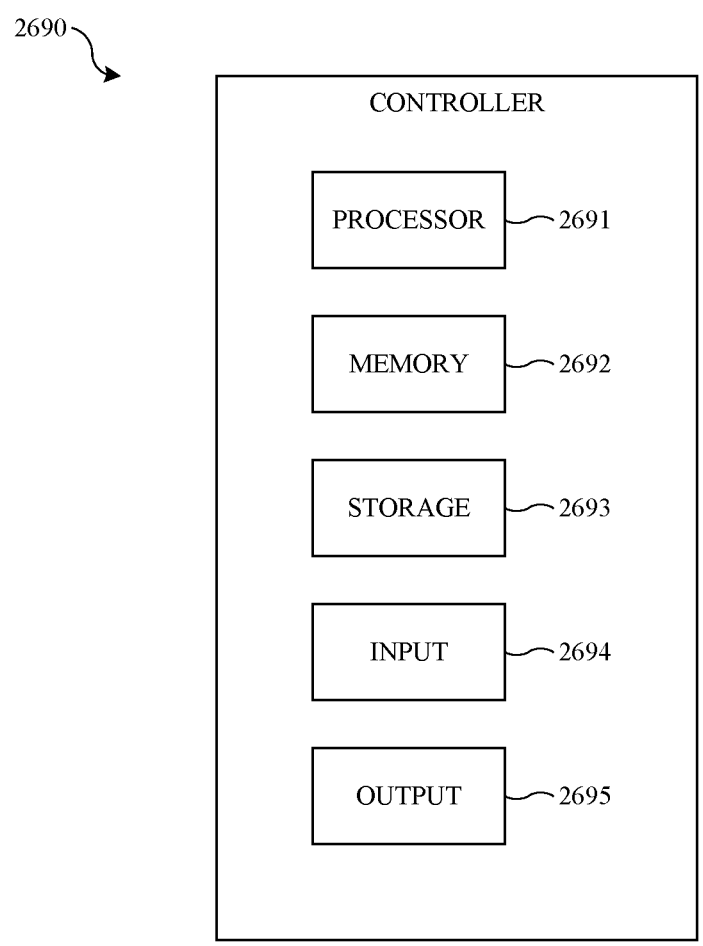
FIG. 26 is a block diagram that shows a controller.

FIG. 26 is a block diagram that shows a controller 2690 that may be used to implement the control system 2587 and/or other computer-implemented systems that are described herein. The controller 2690 may include a processor 2691, a memory 2692, a storage device 2693, one or more input devices 2694, and one or more output devices 2695. The controller 2690 may include a bus or a similar device to interconnect the components for communication. The processor 2691 is operable to execute computer program instructions and perform operations described by the computer program instructions. As an example, the processor 2691 may be a conventional device such as a central processing unit. The memory 2692 may be a volatile, high-speed, short-term information storage device such as a random-access memory module. The storage device 2693 may be a non-volatile information storage device such as a hard drive or a solid-state drive. The input devices 2694 may include any type of human-machine interface such as buttons, switches, a keyboard, a mouse, a touchscreen input device, a gestural input device, or an audio input device. The output devices 2695 may include any type of device operable to provide an indication to a user regarding an operating state, such as a display screen or an audio output, or any other functional output or control.

As used in the claims, phrases in the form of "at least one of A, B, or C" should be interpreted to encompass only A, or only B, or only C, or any combination of A, B and C.

As described above, one aspect of the present technology is vehicle control, which may, in some implementations, include the gathering and use of data available from various sources to customize operation of vehicle systems based on user preferences. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information. As one example, information describing user preferences may be collected to adjust vehicle operating parameters. The vehicle may include sensors that are used to control operation of the vehicle, and these sensors may obtain information (e.g., still pictures or video images) that can be used to identify persons present in the image.

The present disclosure recognizes that the use of such personal information data, in the present technology, can be used to the benefit of users. For example, the personal information data can be used to develop a user profile that describes user preferences.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide personal data for use in operation of the vehicle. In yet another example, users can select to limit the length of time personal data is maintained or entirely prohibit the use and storage of personal data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, vehicle operating parameters can be determined using non-personal information data or a bare minimum amount of personal information, other non-personal information available to the devices, or publicly available information.

What is claimed is:

1. A vehicle, comprising:
a vehicle body that defines a wheel arch;
a wheel assembly that is located in the wheel arch;
a panel that is located adjacent to the wheel arch and inboard relative to the wheel assembly; and
an actuator that is configured to move the panel between an extended position and a retracted position, wherein the panel is adjacent to the wheel assembly in the extended position and the panel is spaced from the wheel assembly in the retracted position,
wherein the actuator is configured to move the panel between the extended position and the retracted position in response to a control signal that is generated based on a sensed condition.

2. The vehicle of claim 1, wherein the sensed condition is a vehicle speed of the vehicle.

3. The vehicle of claim 1, wherein the sensed condition is a steering movement of the wheel assembly.

4. The vehicle of claim 1, wherein the sensed condition is a current location of the vehicle.

5. The vehicle of claim 4, wherein the actuator moves the panel to the extended position if the current location of the vehicle corresponds to a limited access highway and the actuator moves the panel to the retracted position if the current location of the vehicle corresponds to a non-limited access road.

6. The vehicle of claim 1, wherein the sensed condition is an imminent upcoming steering movement.

7. The vehicle of claim 6, wherein the imminent upcoming steering movement is at least one of predicted based on navigation data or predicted based on autonomous vehicle control information.

8. A vehicle, comprising:
a wheel arch;
a wheel assembly that is located in the wheel arch;
a panel that is located inboard from the wheel assembly, wherein the panel includes a base portion and a first panel portion that is connected to the base portion; and
an actuator that is configured to move the panel between an extended position and a retracted position, wherein the first panel portion is adjacent to the wheel assembly in the extended position and the first panel portion is moved inboard relative to the base portion to define the retracted position.

9. The vehicle of claim 8, wherein the first panel portion is slidingly connected to the base portion in a stacked configuration.

10. The vehicle of claim 8, wherein the first panel portion is connected to the base portion in a telescoping configuration.

11. The vehicle of claim 8, further comprising:
a second panel portion, wherein the first panel portion and the second panel portion are slidingly connected to the base portion in a stacked configuration.

12. The vehicle of claim 8, further comprising:
a second panel portion, wherein the first panel portion and the second panel portion are slidingly connected to the base portion in a telescoping configuration.

* * * * *